(12) United States Patent
Liu et al.

(10) Patent No.: US 10,230,980 B2
(45) Date of Patent: Mar. 12, 2019

(54) OVERLAPPED MOTION COMPENSATION FOR VIDEO CODING

(71) Applicant: QUALCOMM Incorporated, San Diego, CA (US)

(72) Inventors: Hongbin Liu, Beijing (CN); Ying Chen, San Diego, CA (US); Jianle Chen, San Diego, CA (US); Xiang Li, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 15/005,934

(22) Filed: Jan. 25, 2016

(65) Prior Publication Data

US 2016/0219302 A1     Jul. 28, 2016

Related U.S. Application Data

(60) Provisional application No. 62/107,964, filed on Jan. 26, 2015, provisional application No. 62/116,631, filed on Feb. 16, 2015.

(51) Int. Cl.
*H04N 19/583* (2014.01)
*H04N 19/44* (2014.01)
*H04N 19/176* (2014.01)
*H04N 19/423* (2014.01)
*H04N 19/167* (2014.01)
*H04N 19/70* (2014.01)

(52) U.S. Cl.
CPC ......... *H04N 19/583* (2014.11); *H04N 19/167* (2014.11); *H04N 19/176* (2014.11); *H04N 19/423* (2014.11); *H04N 19/44* (2014.11); *H04N 19/70* (2014.11)

(58) Field of Classification Search
CPC .................................................. H04N 19/583
See application file for complete search history.

(56) References Cited

U.S. PATENT DOCUMENTS 9,071,851 B2    6/2015 Guo et al.
2005/0078755 A1    4/2005 Woods et al.
(Continued)

OTHER PUBLICATIONS

Z. Wang, W. Wang, Y. Lu, H. Cui, K. Tang; Coding mode adapted overlapped block motion compensation in H.264; Oct. 4-6, 2006; IMACS Multiconference on "Computational Engineering in Systems Applications" (CESA).*

(Continued)

*Primary Examiner* — Anner N Holder
*Assistant Examiner* — Hesham K Abouzahra
(74) *Attorney, Agent, or Firm* — Shumaker & Sieffert, P.A.

(57) ABSTRACT

In an example, a method of decoding video data may include receiving a first block of video data. The first block of video data may be a sub-block of a prediction unit. The method may include receiving one or more blocks of video data that neighbor the first block of video data. The method may include determining motion information of at least one of the one or more blocks of video data that neighbor the first block of video data. The method may include decoding, using overlapped block motion compensation, the first block of video data based at least in part on the motion information of the at least one of the one or more blocks that neighbor the first block of video data.

34 Claims, 12 Drawing Sheets

(56) References Cited

U.S. PATENT DOCUMENTS

| | | | |
|---|---|---|---|
| 2010/0215101 A1* | 8/2010 | Jeon | H04N 19/105 375/240.12 |
| 2012/0177120 A1 | 7/2012 | Guo et al. | |
| 2013/0128974 A1* | 5/2013 | Chien | H04N 19/00903 375/240.15 |
| 2016/0219278 A1 | 7/2016 | Chen et al. | |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Oct. 4, 2011, 226 pp.

Bross et al., "WD5: Working Draft 5 of High-Efficiency Video Coding," 7th Meeting: Geneva, Switzerland, Dec. 30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 9, 2012, JCTVC-J1003_d7, 261 pp.

Bross et al., "High efficiency video coding (HEVC) text specification draft 9," 11th Meeting: Shanghai, CN, Nov. 2, 2012, JCTVC-K1003_v7, 290 pp.

Bross et al., "High efficiency video coding (HEVC) text specification draft 10 (For FDIS & Last Call)," 12th Meeting: Geneva, CH, Mar. 19, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, Annex D, 55 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

ITU-T H.263, Transmission of Non-Telephone Signals; Video Coding for Low Bit Rate Communication, The International Telecommunication Union. Mar. 1996, 52 pp.

Bossen, "Common Test Conditions and Software Reference Configurations", Joint Collaborative Team on Video Coding (JCT-VC) of ITU-T SG16 WP3 and ISO/IEC JTC1/SC29/WG11, 12th Meeting: Geneva, CH Jan. 14-23, 2013, Apr. 9, 2013; JCTVC-L1100, 4 pp.

ITU-T H.263, "Series H: Audiovisual and Multimedia Systems, Infrastructure of audiovisual services—Coding of moving video: Video coding for low bit rate communication", The International Telecommunication Union, Jan. 2005, Annex D, pp. 63-66.

ITU-T H.263, "Series H: Audiovisual and Multimedia Systems, Infrastructure of audiovisual services—Coding of moving video: Video coding for low bit rate communication", The International Telecommunication Union, Jan. 2005, Annex F, pp. 74-77.

ITU-T H.263, "Series H: Audiovisual and Multimedia Systems, Infrastructure of audiovisual services—Coding of moving video: Video coding for low bit rate communication", The International Telecommunication Union, Jan. 2005, Annex J, pp. 90-94.

ITU-T H.263, "Series H: Audiovisual and Multimedia Systems, Infrastructure of audiovisual services—Coding of moving video: Video coding for low bit rate communication", The International Telecommunication Union, Jan. 2005, Chapter 3, pp. 12-16.

Karczewicz, et al., "Improved H.264 Intra Coding Based on Bi-Directional Intra Prediction, Directional Transform, and Adaptive Coefficient Scanning", 15th IEEE International Conference on Image Processing, 2008. ICIP 2008, Oct. 2008, pp. 2116-2119.

QUALCOMM Incorporated, "Coding tools investigation for next generation video coding", ITU, Telecommunication Standardization Sector, COM 16-C 806-E, Jan. 2015, 7 pp.

Sullivan, et al., "Overview of the High Efficiency Video Coding (HEVC) Standard," IEEE Transactions on Circuits and Systems for Video Technology, IEEE Service Center, Piscataway, NJ, US, vol. 22, No. 12, Dec. 2012, XP011487803, pp. 1649-1668.

Tech, et al., "3D-HEVC Draft Text 6," Oct. 18-24, 2014, Joint Collaborative Team on 3D Video Coding Extensions of ITU-T SG 16 WP 3 and ISO/IEC JTC 1/SC 29/WG 11, 10th Meeting: Strasbourg, FR, Dec. 6, 2014; document No. JCT3V-J1001-v6, 99 pp. [uploaded in parts].

Wiegand, et al., "WD3: Working Draft 3 of High-Efficiency Video Coding," Joint Collaborative Team on 3D Video Coding Extensions of ITU-T SG 16 WP 3 and ISO/IEC JTC 1/SC 29/WG 11, Mar. 16-23, 2011; Document: JCTVC-E603_d1, 167 pp.

Choi K., et al., "Information on Coding Efficiency Improvements over HEVC for 4K Content", Samsung Electronics, International Organisation for Standardisation Organisation Internationale De Normalisation ISO/IEC JTC1/SC29/WG11 Coding of Moving Pictures and Audio, ISO/IEC JTC1/SC29/WG11 MPEG2015/M37043, Geneva, Switzerland, Oct. 2015, 10 Pages.

Lan C., et al., "Enhancement of HEVC using Signal Dependent Transform (SDT)", Microsoft Corp. and University of Science and Technology of China, International Organisation for Standardisation Organisation Internationale De Normalisation ISO/IEC JTC1/SC29/WG11 Coding of Moving Pictures and Audio, ISO/IEC JTC1/SC29/WG11 MPEG2015/M37503, Geneva, Switzerland, Oct. 2015, 7 Pages.

Lin S., et al., "Affine Transform Prediction for Next Generation Video Coding", Huawei Technologies, International Organisation for Standardisation Organisation Internationale De Normalisation ISO/IEC JTC1/SC29/WG11 Coding of Moving Pictures and Audio, ISO/IEC JTC1/SC29/WG11 MPEG2015/m37525, Geneva, Switzerland, Oct. 2015, 10 Pages.

Said A., et al., "Position Dependent Intra Prediction Combination", Qualcomm Incorporated, International Organisation for Standardisation Organisation Internationale De Normalisation ISO/IEC JTC1/SC29/WG11 Coding of Moving Pictures and Audio, ISO/IEC JTC1/SC29/WG11 MPEG2015/M37502, Geneva, CH, Oct. 2015, 4 Pages.

Alshina et al., "Known tools performance investigation for next generation video coding", 52nd Meeting, Jun. 19 through 26, 2015, Warsaw, Poland; ITU-Telecommunications Standarization Sector Study Group 16 Question 6 Video Coding Experts Group (VCEG), VCEG-AZ05, Jun. 18, 2015, 5 pp.

Alshina et al., "Known tools performance investigation for next generation video coding", 52nd Meeting, Jun. 19 through 26, 2015, Warsaw, Poland; ITU-Telecommunications Standarization Sector Study Group 16 Question 6 Video Coding Experts Group (VCEG), VCEG-AZ05_11, Jun. 25, 2015, 7 pp.

Alshina et al., "VCEG-AZ05: Known tools performance investigation for next generation video coding", 52nd Meeting, Jun. 19 through 26, 2015, Warsaw, Poland; ITU-Telecommunications Standarization Sector Study Group 16 Question 6 Video Coding Experts Group (VCEG), VCEG-AZO5 powerpoint, Jun. 25, 2015, 9 pp.

(56) References Cited

OTHER PUBLICATIONS

Liu et al., "Local Illumination Compensation", 52nd Meeting, Jun. 19 through 26, 2015, Warsaw, Poland; ITU-Telecommunications Standarization Sector Study Group 16 Question 6 Video Coding Experts Group (VCEG), VCEG-AZ06_r1, Jun. 25, 2015, 4 pp.
Liu et al., "Local Illumination Compensation", 52nd Meeting, Jun. 19 through 26, 2015, Warsaw, Poland; ITU-Telecommunications Standarization Sector Study Group 16 Question 6 Video Coding Experts Group (VCEG), VCEG-AZ06, Jun. 18, 2015, 4 pp.
Chen et al., "Further improvements to HMKTA-1.0", 52nd Meeting, Jun. 19 through 26, 2015, Warsaw, Poland; ITU-Telecommunications Standarization Sector Study Group 16 Question 6 Video Coding Experts Group (VCEG),VCEG-AZ07, Jun. 19, 2015, 8 pp.
Chen et al., "Further improvements to HMKTA-1.0", 52nd Meeting, Jun. 19 through 26, 2015, Warsaw, Poland; ITU-Telecommunications Standarization Sector Study Group 16 Question 6 Video Coding Experts Group (VCEG),VCEG-AZ07_v2, Jun. 23, 2015, 9 pp.
Chen et al., "Further improvements to HMKTA-1.0", 52nd Meeting, Jun. 19 through 26, 2015, Warsaw, Poland; ITU-Telecommunications Standarization Sector Study Group 16 Question 6 Video Coding Experts Group (VCEG),VCEG-AZ07_v3, Jun. 25, 2015, 9 pp.
Chen et al., "VCEG-AZ07-Further improvements to HMKTA-1.0", 52nd Meeting, Jun. 19 through 26, 2015, Warsaw, Poland; ITU-Telecommunications Standarization Sector Study Group 16 Question 6 Video Coding Experts Group (VCEG),VCEG-AZ07_v3 power point, Jun. 25, 2015, 13 pp.
Lan et al., "Enhancement of HEVC using Signal Dependent Transform (SDT)", 52nd Meeting, Jun. 19 through 26, 2015, Warsaw, Poland; ITU-Telecommunications Standarization Sector Study Group 16 Question 6 Video Coding Experts Group (VCEG),VCEG-AZ08, Jun. 21, 2015, 7 pp.
Lan et al., "VCEG=AZ08-Enhancement of HEVC using Signal Dependent Transform (SDT)", 52nd Meeting, Jun. 19 through 26, 2015, Warsaw, Poland; ITU-Telecommunications Standarization Sector Study Group 16 Question 6 Video Coding Experts Group (VCEG),VCEG-AZ08 powerpoint , Jun. 21, 2015, 6 pp.
Lan et al., "VCEG=AZ08-Enhancement of HEVC using Signal Dependent Transform (SDT)", 52nd Meeting, Jun. 19 through 26, 2015, Warsaw, Poland; ITU-Telecommunications Standarization Sector Study Group 16 Question 6 Video Coding Experts Group (VCEG),VCEG-AZ08_V2, Jun. 25, 2015, 7 pp.
Chien et al., "Extension of Advanced Temporal Motion Vector Predictor (ATMVP)", 52nd Meeting, Jun. 19 through 26, 2015, Warsaw, Poland; ITU-Telecommunications Standarization Sector Study Group 16 Question 6 Video Coding Experts Group (VCEG),VCEG-AZ10, Jun. 18, 2015, 4 pp.
Chien et al., "Extension of Advanced Temporal Motion Vector Predictor (ATMVP)", 52nd Meeting, Jun. 19 through 26, 2015, Warsaw, Poland; ITU-Telecommunications Standarization Sector Study Group 16 Question 6 Video Coding Experts Group (VCEG),VCEG-AZ10_r1, Jun. 25, 2015, 4 pp.
Chien et al., "VCEG-AZ10-Extension of Advanced Temporal Motion Vector Predictor", 52nd Meeting, Jun. 19 through 26, 2015, Warsaw, Poland; ITU-Telecommunications Standarization Sector Study Group 16 Question 6 Video Coding Experts Group (VCEG),VCEG-AZ10 powerpoint, Jun. 25, 2015, 4 pp.
Response to Written Opinion dated Apr. 29, 2016, from International Application No. PCT/US2016/014857, filed on Nov. 17, 2016, 5 pp.
Second Written Opinion from International Application No. PCT/US2016/014857, dated Jan. 27, 2017 [sic], 8 pp.
Chen J., et al., "Algorithm Description of Joint Exploration Test Model 3", Document: JVET-C1001_v3, Joint Video Exploration Team (JVET) of ITU-T SG 16 WP 3 and ISO/IEC JTC 1/SC 29/WG 11, 3rd Meeting: Geneva, CH, May 26 through Jun. 1, 2016, 37 Pages.
Rosewarne et al., "High Efficiency Video Coding (HEVC) Test Model 16 (HM 16) Improved Encoder Description Update 4", 22nd Meeting, Oct. 15 through 21, 2015, Joint Collaborative Team on Video Coding (JCT-VC) of ITU-T SG16 and ISO/IEC JTC1/SC29/WG11, JCTVC-V1002, Feb. 12, 2016, 62 pp.
Suehring et al., "JEVT common test conditions and software reference configurations", 2nd Meeting, Feb. 20 through 26, 20016, San Diego, USA; Joint Collaborative Video Exploration Team (JVET) of ITU-T-SG16 WP3 and ISO/IEC JTC1/SC29/WG11, JVET-B1010, Apr. 4, 2016, 4 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
Chien W.J., et al., "Extension of Advanced Temporal Motion Vector Predictor (ATMVP)," ITU-Telecommunications Standardization Sector, 52nd Meeting; Jun. 19-26, 2015, No. VCEG-AZ10, XP030003891, 4 pp.
Huawei Technology Ltd. Co., "Reference sample adaptive filtering for intra coding," ITU, Telecommunication Standardization Sector, COM 16-C 983-E, Oct. 2015, 4 Pages.
International Preliminary Report on Patentability from International Application No. PCT/US2016/014857, dated Apr. 5, 2017, 10 pp.
Bross, et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d6, 278 pp. [uploaded in parts].
Chen, et al., "Implementation of Multiple Macroblock Mode Overlapped Block Motion Compensation for Wavelet Video Coding," Circuits Systems Signal Processing, vol. 26, No. 1, 2007, pp. 55-67. (Applicant points out, in accordance with MPEP 609.04(a), that the year of publication, 2007, is sufficiently earlier than the effective U.S. filing date, Jan. 25, 2016, so that the particular month of publication is not in issue.).
International Search Report and Written Opinion from International Application No. PCT/US2016/014857, dated Apr. 29, 2016, 13 pp.
ITU-T H.265, "Series H: Audiovisual and Multimedia Systems, Infrastructure of Audiovisual Services—Coding of moving video : High efficiency video coding", The International Telecommunication Union, Apr. 2013, 317 pp. [uploaded in parts].
ITU-T H.265, "Series H: Audiovisual and Multimedia Systems, Infrastructure of Audiovisual Services—Coding of moving video : High efficiency video coding", The International Telecommunication Union, Apr. 2013, Annex D, pp. 240-292.
Karczewicz, et al., "Study of Coding Efficiency Improvements beyond HEVC," MPEG Meeting; Oct. 19-23, 2015; Geneva; (Motion Picture Expert Group or ISO/IEC JTC1/SC29/WG11), No. M37102, Oct. 15, 2015, XP030065470, 13 pp.
Song, et al., "A New Proposal on Motion Estimation with the OBMC on/off Mode for the Advanced Mode," 39. MPEG Meeting; Apr. 7-11, 1997; Bristol; (Motion Pictureexpert Group or ISO/IEC JTC1/SC29/WG11), No. M2057, Mar. 30, 1997, XP030031345, ISSN: 0000-0323, 10 pp.
Wang, et al., "Coding mode adapted overlapped block motion compensation in H.264", Computational Engineering in Systems Applications, IMACS Multiconferen ce on, IEEE, PI, Oct. 4-6, 2006, pp. 1665-1668, XP031121514, ISBN: 978-7-302-13922-5.

\* cited by examiner

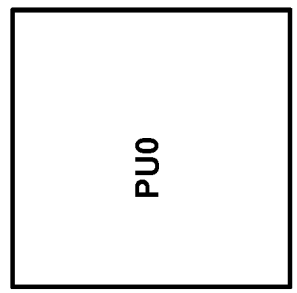
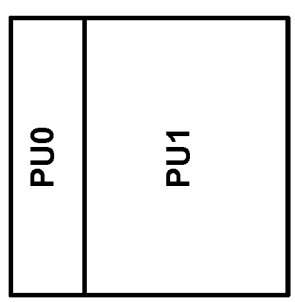
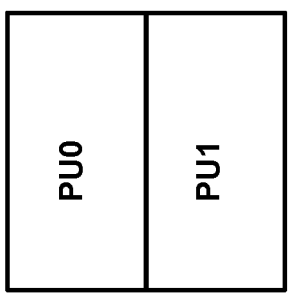
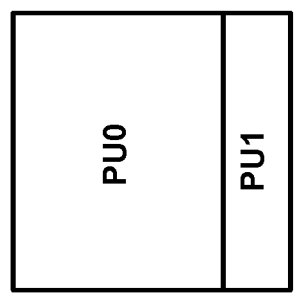
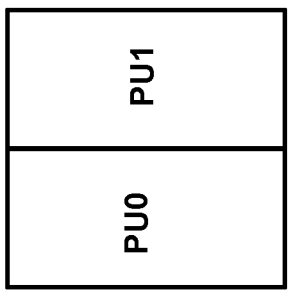
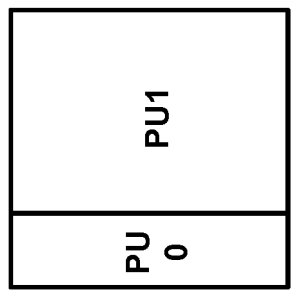
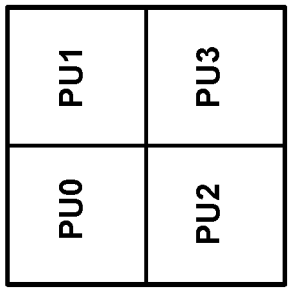
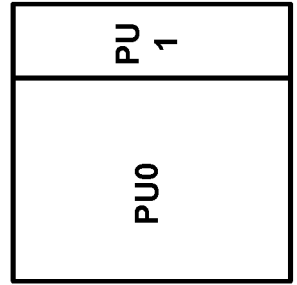
FIG. 2

Sub-block size is smaller than sub-PU size

Sub-block size is equal to sub-PU size

Sub-block size is larger than sub-PU size

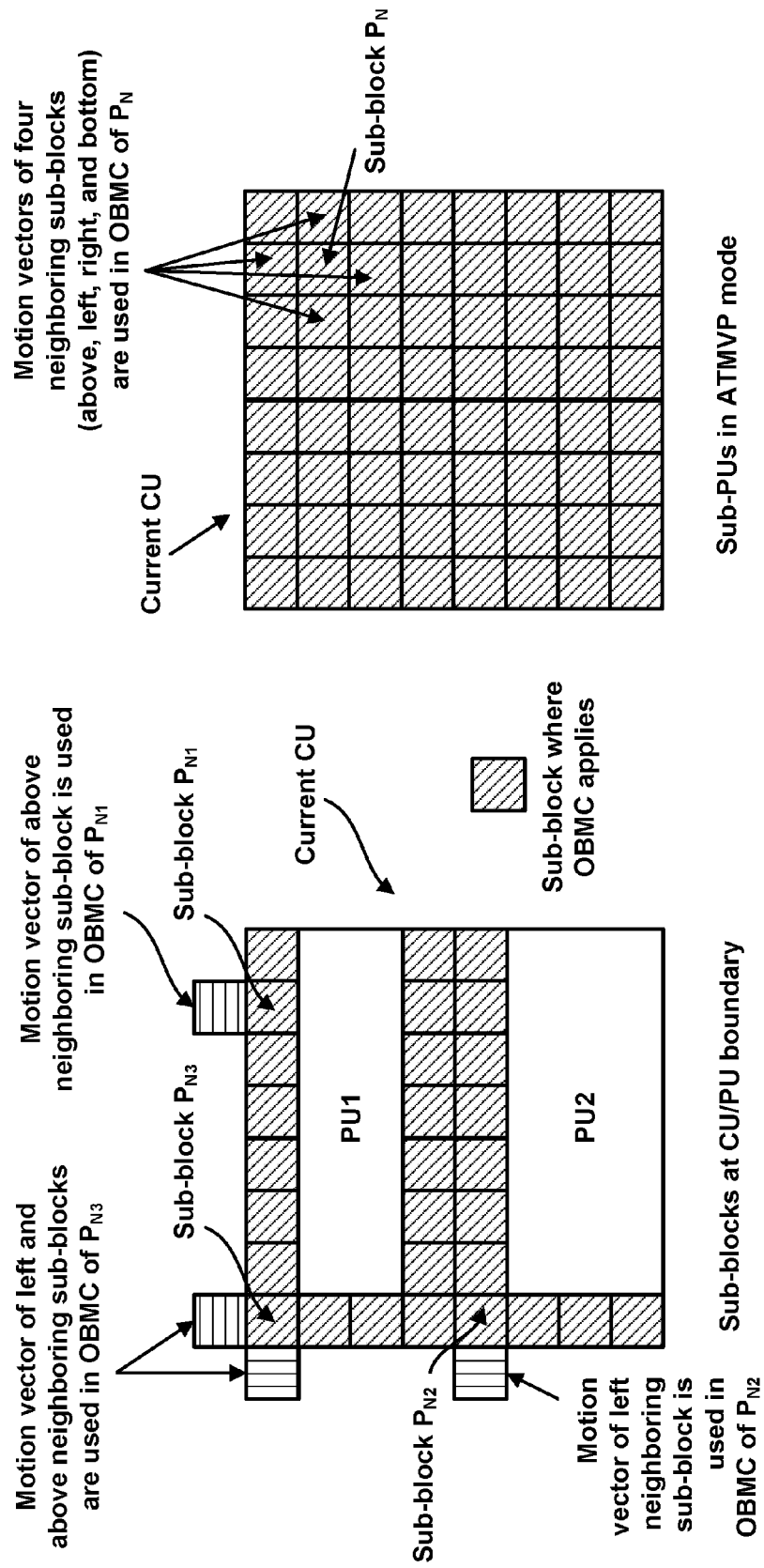

OVERLAPPED MOTION COMPENSATION FOR VIDEO CODING

This application claims the benefit of U.S. Provisional Patent Application No. 62/107,964 filed on Jan. 26, 2015, and U.S. Provisional Patent Application No. 62/116,631 filed on Feb. 16, 2015, each of which is hereby incorporated by reference herein in its entirety.

TECHNICAL FIELD

This disclosure relates to video coding; and more specifically, motion compensation in block based video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

SUMMARY

Techniques of this disclosure relate to block-based video coding. For example, the techniques described in this disclosure may include one or more techniques for encoding or decoding a block of video data using overlapped block motion compensation (OBMC).

In one example, this disclosure describes a method of decoding video data comprising receiving a first block of video data, wherein the first block of video data is a sub-block of a prediction unit; receiving one or more blocks of video data that neighbor the first block of video data; determining motion information of at least one of the one or more blocks of video data that neighbor the first block of video data; and decoding, using overlapped block motion compensation, the first block of video data based at least in part on the motion information of the at least one of the one or more blocks that neighbor the first block of video data.

In another example, this disclosure describes a device for coding video data comprising a memory configured to store the video data; and a video coder in communication with the memory, wherein the video coder is configured to: store a first block of video data in the memory, wherein the first block of video data is a sub-block of a prediction unit; store one or more blocks of video data that neighbor the first block of video data in the memory; determine motion information of at least one of the one or more blocks of video data that neighbor the first block of video data; and code, using overlapped block motion compensation, the first block of video data based at least in part on the motion information of the at least one of the one or more blocks that neighbor the first block of video data.

In another example, this disclosure describes an apparatus for coding video data comprising means for receiving a first block of video data, wherein the first block of video data is a sub-block of a prediction unit; means for receiving one or more blocks of video data that neighbor the first block of video data; means for determining motion information of at least one of the one or more blocks of video data that neighbor the first block of video data; and means for coding, using overlapped block motion compensation, the first block of video data based at least in part on the motion information of the at least one of the one or more blocks that neighbor the first block of video data.

In another example, this disclosure describes a non-transitory computer-readable storage medium having instructions stored thereon that, when executed, cause one or more processors to store a first block of video data in a memory, wherein the first block of video data is a sub-block of a prediction unit; store one or more blocks of video data that neighbor the first block of video data in the memory; determine motion information of at least one of the one or more blocks of video data that neighbor the first block of video data; and code, using overlapped block motion compensation, the first block of video data based at least in part on the motion information of the at least one of the one or more blocks that neighbor the first block of video data.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 2 shows partition modes for inter prediction mode video coding.

FIGS. 6A and 6B show an example of prediction unit (PU)-based OBMC that may be used in HEVC or other video coding standards.

FIGS. 8A-8B show sub-blocks where OBMC may be applied.

DETAILED DESCRIPTION

Figure 1:
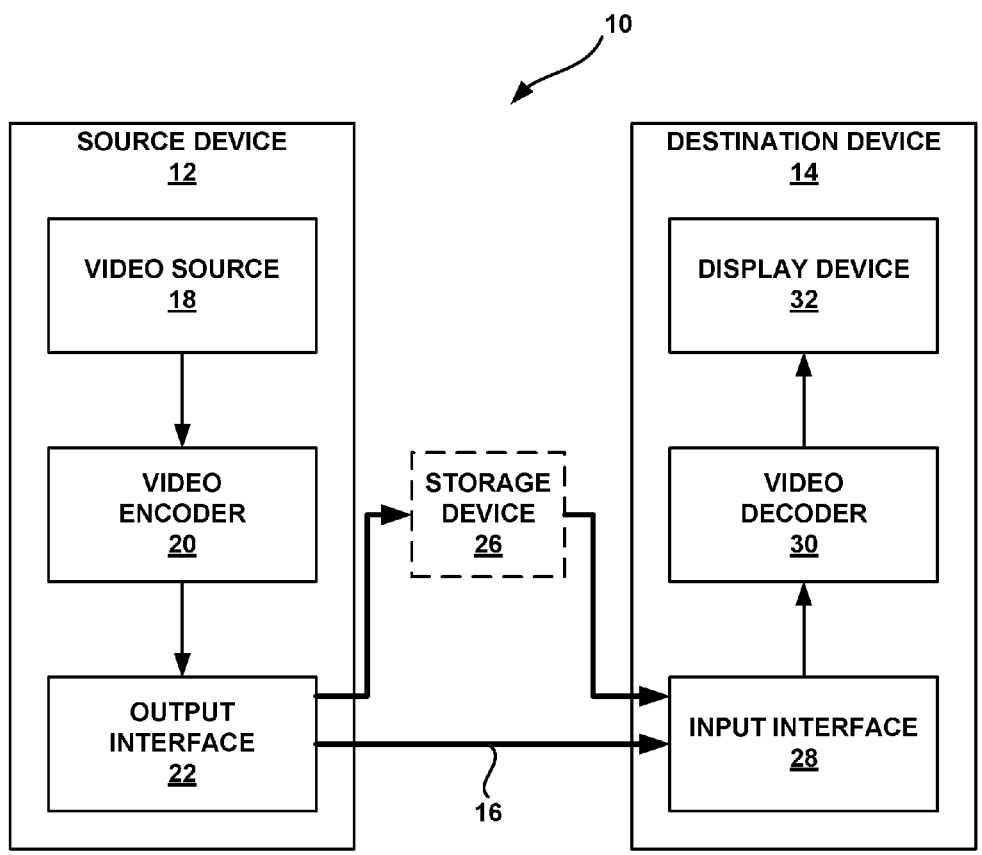
FIG. 1 is a block diagram illustrating an example video encoding and decoding system that may utilize the techniques described in this disclosure.

The techniques of this disclosure generally relate to motion compensation in block based video coding. The techniques of this disclosure may be applied to an existing video codec or video coding standard (e.g., ITU-T H.265, HEVC), or may be applied in a future video codec or video coding standard.

As used herein, instances of the term "content" may be changed to the term "video," and instances of the term "video" may be changed to the term "content." This is true regardless of whether the terms "content" or "video" are being used as an adjective, noun, or other part of speech. For example, reference to a "content coder" also includes reference to a "video coder," and reference to a "video coder" also includes reference to a "content coder." Similarly, reference to "content" also includes reference to "video," and reference to "video" also includes reference to "content."

As used herein, "content" refers to any type of content. For example, "content" may refer to video, screen content, image, any graphical content, any displayable content, or any data corresponding thereto (e.g., video data, screen content data, image data, graphical content data, displayable content data, and the like).

As used herein, the term "video" may refer to screen content, movable content, a plurality of images that may be presented in a sequence, or any data corresponding thereto (e.g., screen content data, movable content data, video data, image data, and the like).

As used herein, the term "image" may refer to a single image, one or more images, one or more images amongst a plurality of images corresponding to a video, one or more images amongst a plurality of images not corresponding to a video, a plurality of images corresponding to a video (e.g., all of the images corresponding to the video or less than all of the images corresponding to the video), a sub-part of a single image, a plurality of sub-parts of a single image, a plurality of sub-parts corresponding to a plurality of images, one or more graphics primitives, image data, graphical data, and the like.

As used herein, "motion information" may refer to or otherwise include motion vector information, or more simply, a motion vector. In other examples, "motion information" may refer to or otherwise include motion information different from motion vector information. In yet other examples, "motion information" may refer to one or more motion vectors and any other motion related information, such as a prediction direction identifying the reference picture list(s) to be used and one or more reference indices identifying the reference picture(s) in the reference picture list(s). As used herein, "a set of motion information" or the like may refer to "motion information." Similarly, "motion information" may refer to "a set of motion information" or the like.

As used herein, a "neighbor," a "neighboring block," "neighbor block," and the like refer to a block of video that neighbors another block of video data on at least one side/border. For example, a current block of video data may have four sides: left, right, top, and bottom. A neighboring block of video data to the current block of video data may include any block of video data that borders the left, right, top, or bottom border of the current block of video. As another example, a first block that neighbors the second block shares a border (e.g., left border, right border, top border, or bottom border) of the second block.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding. Video encoder 20 and video decoder 30 of video coding system 10 represent examples of devices that may be configured to perform techniques for encoding or decoding a block of video data using overlapped block motion compensation in accordance with various examples described in this disclosure.

Video encoder 20 and/or video decoder 30 may be configured to operate according to the techniques described in this disclosure. Video decoder 30 may be configured to perform a process generally reciprocal to that of video encoder 20 described herein. Similarly, video encoder 20 may be configured to perform a process generally reciprocal to that of video decoder 30 described herein.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise any type of medium and/or one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In some examples, encoded data may be output from output interface 22 to a storage device 26, which may be configured to store encoded video data generated by source device 12. Though depicted as being separate from channel 16, it is understood that channel 16 may be communicatively coupled to storage device 26 in other examples. In this example, destination device 14 may access encoded video data stored on storage device 26. For example, encoded video data may be accessed from storage device 26 by input interface 28.

Storage device 26 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In some examples, storage device 26 may correspond to a file server or another intermediate storage device that stores the encoded video data generated by source device 12. In such examples, the file server may be any type of server capable of storing encoded video data and transmitting the encoded video data to destination device 14. Example file servers include, for example, web servers (e.g., for a website), file transfer protocol (FTP) servers, network attached storage (NAS) devices, and local disk drives.

Destination device 14 may access the encoded video data through any data connection (e.g., any standard data connection or otherwise), including, for example, an Internet connection. Example types of data connections may include a wireless channel (e.g., a Wi-Fi connection), a wired channel (e.g., DSL, cable modem, etc.), or any combination of both that is suitable for accessing encoded video data stored on storage device 26 (e.g., a file server). The transmission of encoded video data from storage device 26 may be a streaming transmission, a download transmission, or a combination of both.

The techniques of this disclosure are not limited to wireless applications or settings. The techniques of this disclosure may be applied to video coding in support of any of a variety of multimedia applications, such as over-the-air television broadcasts, cable television transmissions, satellite television transmissions, streaming video transmissions, e.g., via the Internet, encoding of video data for storage on a data storage medium, decoding of encoded video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may be configured to encode video data from video source 18. For example, video encoder 20 may be configured to encode captured, pre-captured, or computer-generated video data (or any other data). In some examples, source device 12 directly transmits the encoded video data to destination device 14 via output interface 22. In other examples, the encoded video data may also be stored onto a storage medium (e.g., storage device 26) for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. The encoded video data communicated over channel 16, or provided by storage device 26, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with or may be external to destination device 14. In some examples, destination device 14 may include an integrated display device and also be configured to interface with an external display device. In other examples, destination device 14 may be a display device. In general, display device 32 displays decoded video data. Display device 32 may comprise any of a variety of display devices such as a liquid crystal display (LCD), a plasma display, an organic light emitting diode (OLED) display, or another type of display device.

Techniques of this disclosure may utilize HEVC terminology or other video standard terminology for ease of explanation. However, it is understood that the techniques of this disclosure are not limited to HEVC or other video standards. The techniques of this disclosure may be implemented in successor standards to HEVC and its extensions as well as other video standards, whether past, present, or future.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium. Thus, while video decoder 30 may be referred to as "receiving" certain information, the receiving of information does not necessarily occur in real- or near-real-time and may be retrieved from a medium at some time after storage.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

In HEVC and other video coding standards, a video sequence typically includes a series of pictures. Pictures may also be referred to as "frames." In some examples, video encoder 20 may be configured to use a picture order count (POC) to identify a display order of a picture relative to a plurality of pictures (e.g., a sequence of pictures). In such examples, video encoder 20 may be configured to assign a POC value to picture. In an example where multiple coded video sequences are present in a bitstream, pictures with the same POC value may be closer to each other in terms of decoding order. POC values of pictures are may be used for reference picture list construction, derivation of a reference picture set as in, for example, HEVC and motion vector scaling.

In some examples, a picture may include three sample arrays. In such examples, a picture may include three sample arrays denoted $S_L$, $S_{Cb}$ and $S_{Cr}$. In such examples, $S_L$ is a two-dimensional array (e.g., a block) of luma samples, $S_{Cb}$ is a two-dimensional array (e.g., a block) of Cb chrominance samples, and SCr is a two-dimensional array (e.g., a block) of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). The set of the CTUs may include a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A video frame or picture may be partitioned into one or more slices. A slice may include an integer number of CTUs ordered consecutively in the raster scan. A coded slice may comprise a slice header and slice data. The slice header of a slice may be a syntax structure that includes syntax elements that provide information about the slice. The slice data may include coded CTUs of the slice.

In some examples, a CU may include a coding node and one or more prediction units (PUs) and/or transform units (TUs) associated with the coding node. The size of the CU may correspond to a size of the coding node and may be square in shape. The size of the CU may range from, for example, 8×8 pixels up to the size of the tree block with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be square or non-square in shape. Syntax data associated with a CU may also describe, for example, partitioning of the CU into one or more TUs according to a quadtree. A TU can be square or non-square in shape.

In general, a PU may include data related to the prediction process. For example, when a PU is intra-mode encoded, the PU may include data describing an intra-prediction mode for the PU. As another example, when a PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU may be used for a transform and quantization processes. A given CU having one or more PUs may also include one or more transform units (TUs). Following prediction, video encoder 20 may calculate residual values corresponding to the PU. The residual values may comprise pixel difference values that may be transformed into transform coefficients, quantized, and scanned using the TUs to produce serialized transform coefficients for entropy coding.

This disclosure may use the term "video unit," "video block," "coding block," or "block" to refer to one or more sample blocks and syntax structures used to code samples of the one or more blocks of samples. Example types of video units or blocks may include coding tree units (CTUs), coding units (CUs), prediction units (PUs), sub-PUs, transform units (TUs), macroblocks (MBs), macroblock partitions, sub-blocks, and so on. In some examples, a sub-block may be a sub-block of a CTU, a sub-block of a CU, a sub-block of a PU, a sub-block of a TU, a sub-block of a macroblock, or a sub-block of a sub-block. For example, a sub-block may contains contain a group of sub-PUs. In such examples, a sub-block may be smaller than a CTU, CU, PU, TU, or macroblock. In some examples, a sub-PU may refer to a block that is smaller than a PU. In such an example, if a PU is 8×4, then a sub-PU may be 4×4.

In some examples, a set of motion information may be available for each block of video data. The set of motion information may include motion information for forward and backward prediction directions. Forward and backward prediction directions may be two prediction directions of a bi-directional prediction mode. Forward and backward prediction directions may be one of two prediction directions of a uni-directional prediction mode. The terms "forward" and "backward" do not necessarily have a geometry meaning, instead they correspond to, for example, reference picture list 0 (RefPicList0) and reference picture list 1 (RefPicList1) of a current picture. When only one reference picture list is available for a picture or slice, only RefPicList0 may be available and the motion information of each block of the picture or slice may be forward.

For each prediction direction (e.g., forward or backward), the motion information may contain a prediction direction, a reference index, and a motion vector. In some examples, for simplicity, a motion vector itself may be referred to in a way that it is assumed that it has an associated reference index. A reference index is used to identify a reference picture in the current reference picture list (e.g., RefPicList0 or RefPicList1). A motion vector may have a horizontal and a vertical component.

Video blocks described herein may have fixed or varying sizes, and may differ in size according to a specified coding standard. As an example, the size of a particular CU may be 2N×2N. In such an example, video encoder 20 may be configured to perform intra-prediction for PUs having sizes of 2N×2N or N×N, and may be configured to perform inter-prediction for PUs having sizes of 2N×2N, 2N×N, N×2N, or N×N. In other examples, the available sizes of a PU may be the same or different.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a positive integer value. The pixels in a block may be arranged in rows and columns. Moreover, blocks need not necessarily have the same number of pixels in the horizontal direction as in the vertical direction. For example, blocks may comprise N×M pixels, where M is or is not equal to N and where M is a positive integer value.

In some examples, the structure of a CU disclosed herein may refer to the structure of a CU as set forth in a video coding standard, such as H.265/HEVC. In HEVC, the largest coding unit in a slice is called a coding tree block (CTB). A CTB contains a quad-tree, the nodes of which are coding units. The size of a CTB ranges from 16×16 to 64×64 in the HEVC main profile; and, in some examples, 8×8 CTB sizes are also supported. A CU may be the same size of a CTB and as small as 8×8. Each CU is coded with one mode. When a CU is inter prediction mode coded, the CU may be further partitioned into 2 or 4 prediction units (PUs) or become just one PU (e.g., PART_2N×2N shown in FIG. 2) when further partition does not apply. When two PUs are present in one CU, they can be half size rectangles (e.g., PART_2N×N or PART_N×2N shown in FIG. 2) or two rectangles with one one-quarter size and the other three-quarter size (e.g., PART_2N×nU, PART_2N×nD, PART_nL×2N, or PART_nR×2N shown in FIG. 2). There are eight partition modes for a CU coded with inter prediction mode, as shown in FIG. 2: PART_2N×2N, PART_2N×N, PART N×2N, PART N×N, PART_2N×nU, PART_2N×nD, PART_nL×2N and PART_nR×2N. When the CU is inter coded, one set of motion information is present for each PU. In addition, each PU is coded with a unique inter-prediction mode to derive the set of motion information.

Referring to macroblocks, e.g., in ITU-T H.264/AVC or other standards, each inter macroblock (MB) may be partitioned four different ways according to one example: one 16×16 MB partition, two 16×8 MB partitions, two 8×16 MB partitions, or four 8×8 MB partitions. Different MB partitions in one MB may have different reference index values for each direction (RefPicList0 or RefPicList1). In an example where an MB is not partitioned into four 8×8 MB partitions, the MB may have only one motion vector for each MB partition in each direction. In an example where an MB is partitioned into four 8×8 MB partitions, each 8×8 MB partition may be further partitioned into sub-blocks, each of which may have a different motion vector in each direction. In such an example, the 8×8 MB partition may be partitioned into one or more sub-blocks four different ways: one 8×8 sub-block, two 8×4 sub-blocks, two 4×8 sub-blocks, or four 4×4 sub-blocks. Each sub-block may have a different motion vector in each direction. In such an example, each motion vector may be present in a level equal to higher than a sub-block.

In some examples, the structure of an MB disclosed herein may refer to the structure of an MB as set forth in a video coding standard, such as ITU-T H.264/AVC. In such examples, video encoder 20 and video decoder 30 may be configured to code video data using temporal direct mode at the MB or MB partition level for skip or direct mode in B slices. For each MB partition, the motion vectors of the block co-located with the current MB partition in the RefPicList1 [0] of the current block may be used to derive the motion vectors. Each motion vector in the co-located block may be scaled based on POC distances. H.264/AVC also includes a spatial direct mode, which may be used to predict motion information from the spatial neighbors.

Referring to FIG. 1, to generate a coded CTU, video encoder 20 may recursively perform quad-tree partitioning on the coding tree blocks of a CTU to divide the coding tree blocks into coding blocks, hence the name "coding tree units." A coding block may be an N×N (or N×M) block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more PUs. A PU may be a square or non-square block of samples on which the same prediction technique is applied. A PU of a CU may be a prediction block of luma samples, two corresponding prediction blocks of chroma samples of a picture, and syntax structures used to predict the prediction block samples. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector (MV). When video encoder 20 uses bi-prediction to generate the predictive blocks for a PU, the PU may have two MVs.

After video encoder 20 generates predictive blocks (e.g., predictive luma, Cb and Cr blocks) for one or more PUs of a CU, video encoder 20 may generate residual blocks for the CU. Each sample in a residual block of the CU may indicate a difference between a sample in a predictive block of a PU of the CU and a corresponding sample in a coding block of the CU. For example, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Video encoder 20 may use quad-tree partitioning to decompose the residual blocks (e.g., luma, Cb and Cr residual blocks) of a CU into one or more transform blocks (e.g., luma, Cb and Cr transform blocks). A transform block may be a block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a transform block to generate a coefficient block for a TU. A coefficient block may be a two-dimensional array of transform coefficients. A transform coefficient may be a scalar quantity. For example, video encoder 20 may apply one or more transforms to a luma transform block of a TU to generate a luma coefficient block for the TU. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

In some examples, following intra-predictive or inter-predictive coding using PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs.

Video encoder 20 may form the TUs including the residual data for the CU, and then transform the TUs to produce transform coefficients for the CU.

After generating a coefficient block (e.g., a luma coefficient block, a Cb coefficient block or a Cr coefficient block), video encoder 20 may quantize the coefficients in the block. Quantization generally refers to a process in which transform coefficients are quantized to possibly reduce the amount of data used to represent the transform coefficients, providing further compression. After video encoder 20 quantizes a coefficient block, video encoder 20 may be configured to entropy encode syntax elements indicating the quantized transform coefficients. For example, video encoder 20 may perform Context-Adaptive Binary Arithmetic Coding (CABAC) on the syntax elements indicating the quantized transform coefficients.

In some examples, video encoder 20 may utilize a predefined scan order (e.g., horizontal, vertical, or any other scan order) to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use MVs of PUs to determine predictive blocks for the inter-predicted PUs of a current CU. Likewise, video decoder 30 may generate intra-predicted blocks for PU's of a current CU. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive blocks for PUs of the current CU to corresponding residual values obtained from inverse quantization and inverse transformation of the transform blocks of the TUs of the current CU.

By reconstructing the coding blocks for each CU of a picture, video decoder 30 may reconstruct the picture.

Video encoder 20 and/or video decoder 30 may be configured to operate according to the techniques described in this disclosure. In general, video encoder 20 and/or video decoder 30 may be configured to perform one or more techniques described herein in any combination.

Certain design aspects concerning block partition and motion prediction with respect to AVC and HEVC are introduced or otherwise described herein because, as set forth herein, one or more techniques of this disclosure may be used with or otherwise enhance a video standard (e.g., AVC and/or HEVC), extension(s) thereof, video standards under development, or future video standards, and the like.

Aspects of motion prediction in HEVC will now be discussed. In the HEVC standard, there are two inter prediction modes available for a PU: merge mode (skip is considered as a special case of merge) and advanced motion vector prediction (AMVP). In either AMVP or merge mode, a motion vector (MV) candidate list is maintained for multiple motion vector predictors. The motion vector(s), as well as reference indices in merge mode, of the current PU are generated by taking one candidate from the MV candidate list. The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined. As has been described above, a merge candidate in HEVC corresponds to a full set of motion information while an AMVP candidate in HEVC contains just one motion vector for a specific prediction direction and reference index. The candidates for both merge mode and AMVP mode are derived similarly from the same spatial and temporal neighboring blocks.

Figure 3B:
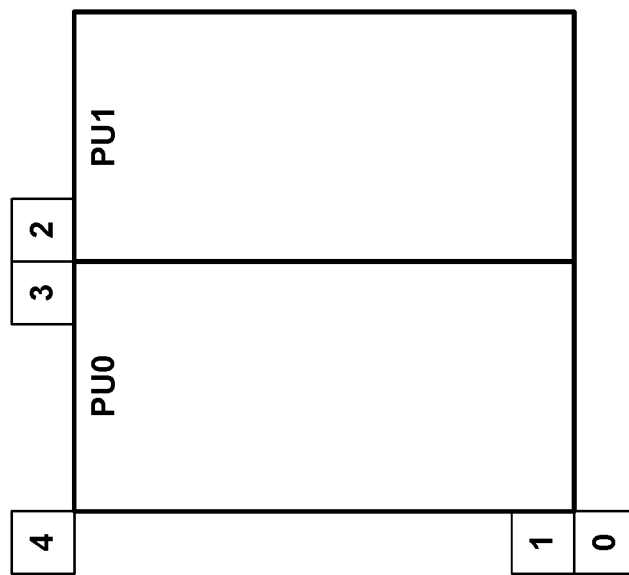
FIGS. 3A and 3B show spatial neighboring motion vector (MV) candidates for merge and advanced motion vector prediction (AMVP) video coding modes, respectively.
Figure 3A:
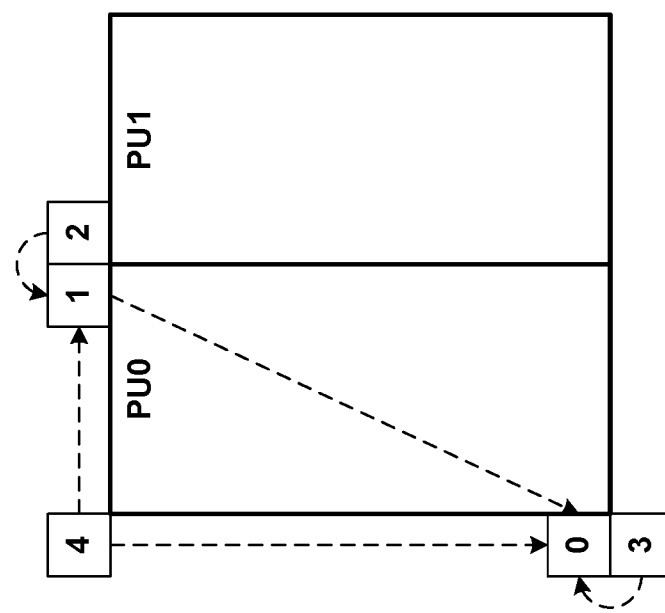

FIGS. 3A and 3B show spatial neighboring MV candidates for merge and AMVP modes, respectively. Spatial MV candidates are derived from the neighboring blocks shown in FIGS. 3A and 3B for a specific PU (PU$_0$ in the example shown). As will be described in more detail below, generation of the candidates from the neighboring blocks differs for merge mode and AMVP mode.

In merge mode, up to four spatial MV candidates can be derived with the order shown in FIG. 3A: left (0), above (1), above right (2), below left (3), and above left (4). In AMVP mode, the neighboring blocks are divided into two groups: left group consisting of blocks 0 and 1, and the above group consisting of blocks 2, 3, and 4 as shown in FIG. 3B. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate, thus the temporal distance differences can be compensated.

Figure 4A:
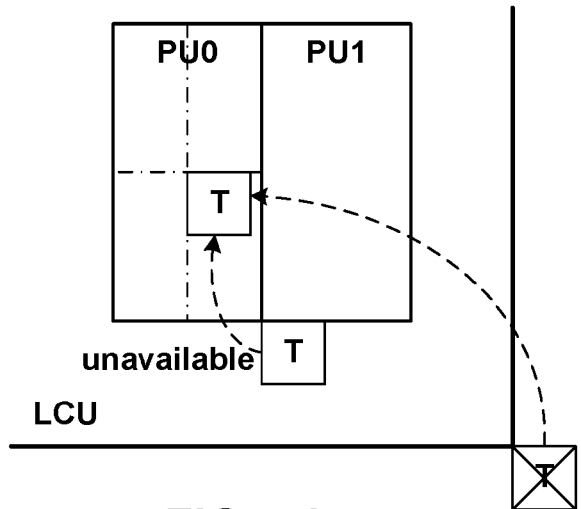
FIG. 4A shows an example of a temporal motion vector prediction (TMVP) candidate.

A temporal motion vector predictor (TMVP) candidate, if enabled and available, is added into the MV candidate list after spatial motion vector candidates. The process of motion vector derivation for TMVP candidate is the same for both merge and AMVP modes; however, the target reference index for the TMVP candidate in the merge mode is always set to 0. The primary block location for TMVP candidate derivation is the bottom right block outside of the collocated PU (shown as block "T" in FIG. 4A) to compensate the bias to the above and left blocks used to generate spatial neighboring candidates. However, if that block is located outside of the current CTB row or motion information is not available, the block is substituted with a center block of the PU.

Figure 4B:
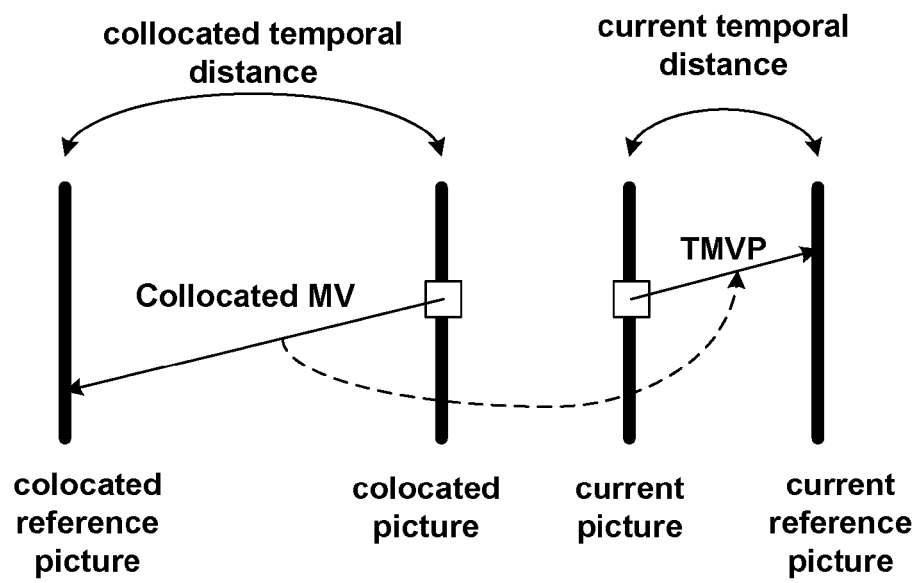
FIG. 4B shows an example of motion vector scaling.

As shown in FIG. 4B, motion vector for TMVP candidate is derived from the co-located PU of the co-located picture, indicated in the slice level. Similar to temporal direct mode in AVC, a motion vector of the TMVP candidate may have motion vector scaling performed to compensate the distance differences.

Other aspects of motion prediction in HEVC will now be described. One such aspect is motion vector scaling. It is assumed that the value of motion vectors is proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore a new distance (based on POC) is calculated. And the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Another aspect of motion prediction in HEVC is artificial motion vector candidate generation. If a motion vector candidate list is not complete, artificial motion vector candidates are generated and inserted at the end of the list until it will have all candidates. In merge mode, there are two types of artificial MV candidates: combined candidate derived only for B-slices and zero candidates used only for AMVP if the first type does not provide enough artificial candidates. For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

Another aspect of motion prediction in HEVC is a pruning process for candidate insertion. Candidates from different blocks may happen to be the same, which decreases the efficiency of a merge mode or AMVP mode candidate list. A pruning process compares one candidate against the others in the current candidate list to avoid inserting identical candidates.

Figure 5:
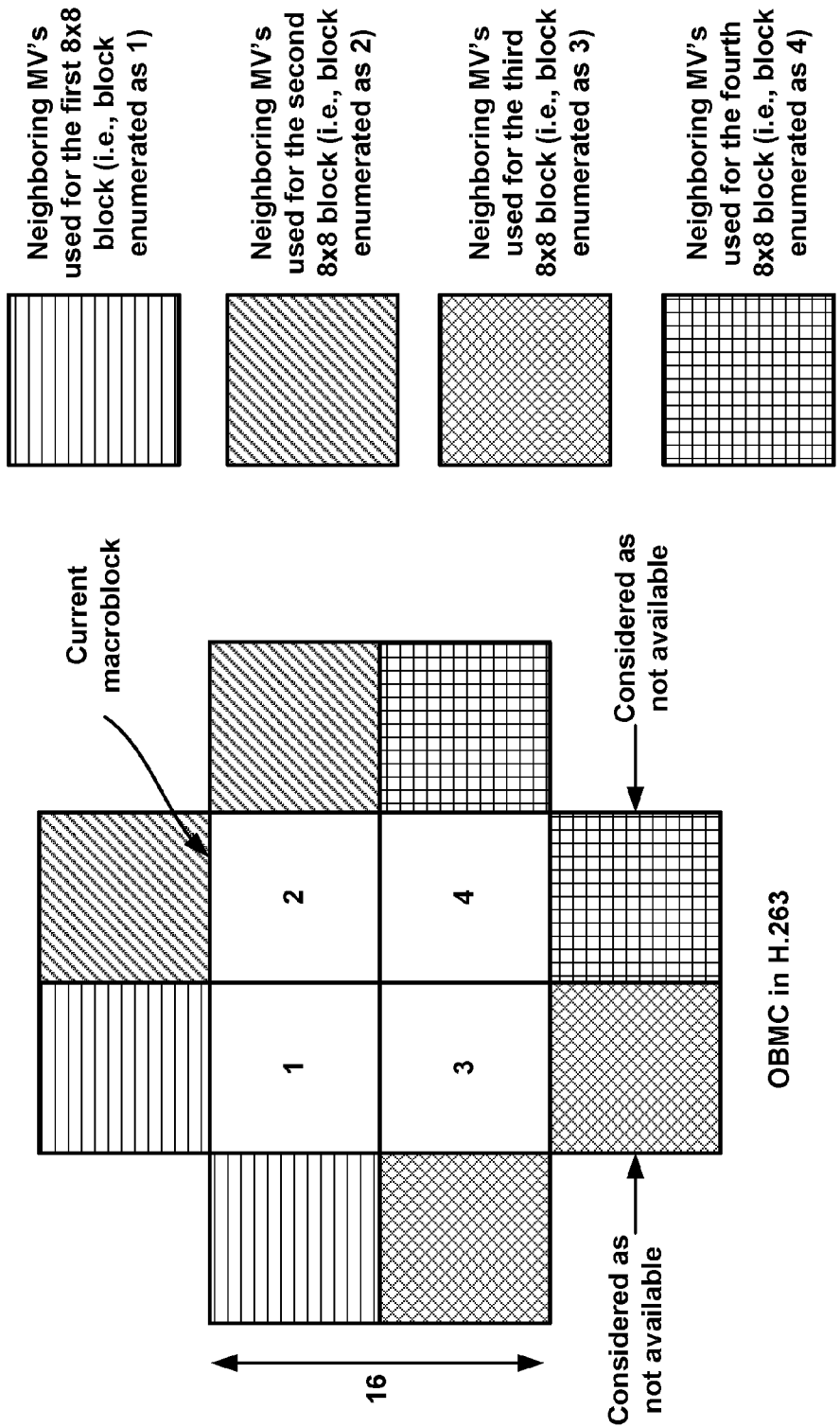
FIG. 5 shows an example of overlapped block motion compensation (OBMC) in as used in the ITU-T H.263 video coding standard.

The general concept of overlapped block motion compensation (OBMC) will now be introduced. OBMC was contemplated in earlier video standards. Overlapped block motion compensation (OBMC) was proposed in the development of H.263 (Video Coding for Low Bitrate Communication, document Rec. H.263, ITU-T, April 1995). OBMC may be performed on the current 8×8 block of a current 16×16 macroblock, and motion vectors of two connected neighboring 8×8 blocks may be used for the current 8×8 block as shown in FIG. 5. For example, for the first 8×8 block (e.g., the block identified with the numeral "1" in FIG. 5) in a current macroblock, besides a prediction block generated using its own motion vector, the above and left neighboring motion vector are also applied to generate two additional prediction blocks. In this way, each pixel in the current 8×8 block has three prediction values, and a weighted average of these three prediction values is used as the final prediction value for each pixel in the current 8×8 block. As another example, for the second 8×8 block (e.g., the block identified with the numeral "2" in FIG. 5) in a current macroblock, besides a prediction block generated using its own motion vector, the above and right neighboring motion vector may also applied to generate two additional prediction blocks. In this way, each pixel in the current 8×8 block has three prediction values, and a weighted average of these three prediction is used as the final prediction value for each pixel in the current 8×8 block.

FIG. 5 shows an example of how OBMC was implemented in H.263. When a neighboring block is not coded or coded as intra (i.e., the neighboring block does not have an available motion vector), the motion vector of the current 8×8 block is used as the neighboring motion vector. Referring now to the third and fourth 8×8 blocks (e.g., the blocks respectively identified with the numerals "3" and "4" in FIG. 5) of the current macroblock, the below neighboring block is always not used (i.e., considered as not available). In other words, for the current macroblock, no motion information from macroblocks below the current macroblock would be used to reconstruct the pixels of the current macroblock during the OBMC. Rather, for block 3, motion information from a left neighbor may be used for OBMC, and for block 4, motion information from a right neighbor may be used for OBMC, but blocks below blocks 3 and 4 are assumed to be not coded, and are not used for OBMC.

Figures 6A, 6B:
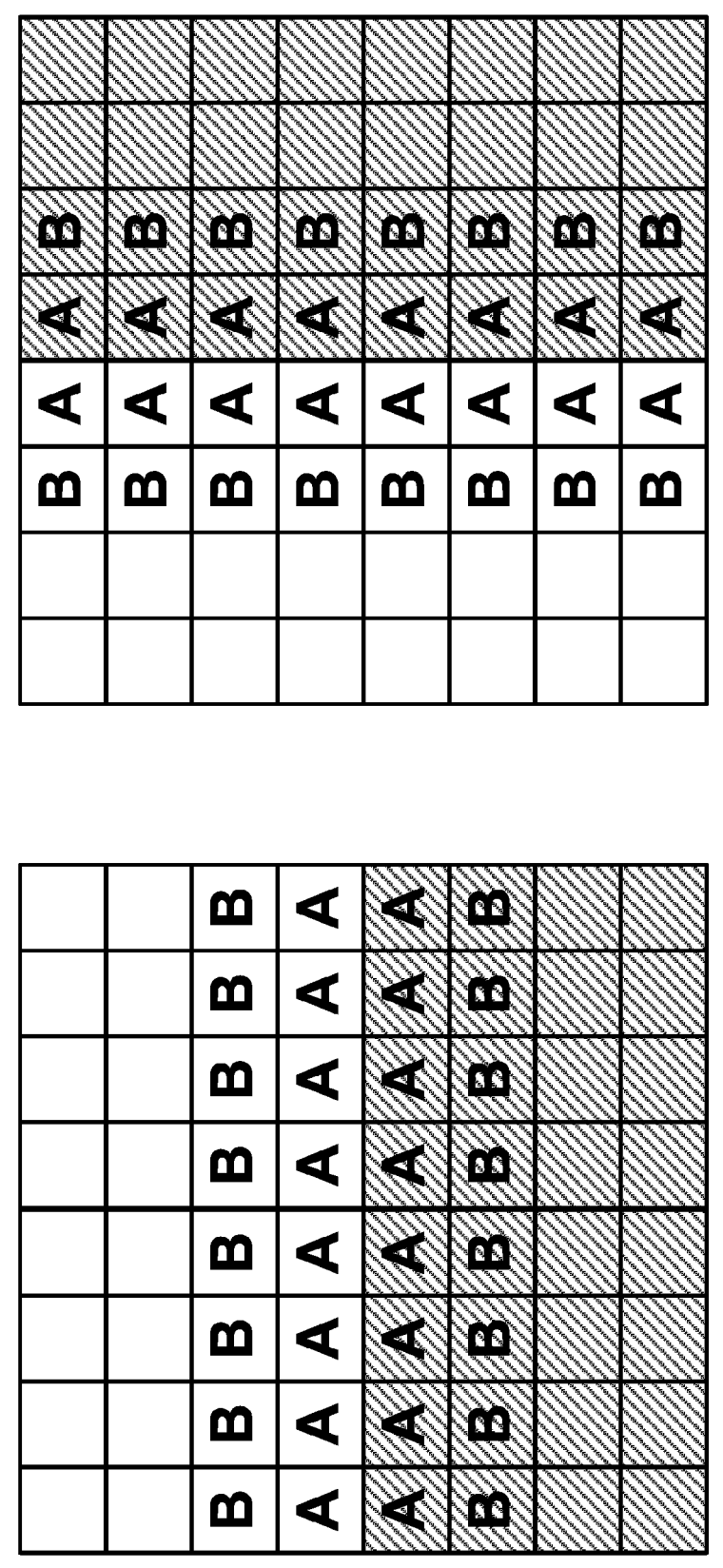

OBMC was proposed for HEVC. In HEVC, OBMC was also proposed to smooth the PU boundary. An example of the proposed method of OBMC in HEVC is shown in FIGS. 6A and 6B. In FIGS. 6A and 6B, PU-based OBMC is illustrated using a white region to represent a first PU (e.g., PU0), and a hatched region to represent a second PU (e.g., PU1). As proposed for HEVC, when a CU contains two or more PUs, rows or columns near the PU boundary are smoothed by OBMC. For pixels marked with "A" or "B" in the first PU and the second PU, two prediction values are generated by respectively applying motion vectors of the first PU (PU0) and the second PU (PU1). As proposed for HEVC, a weighted average of the two prediction values would be used as the final prediction.

In HEVC, each PU contains just one set of motion information. However, when sub-PU based motion prediction/derivation apply, a PU may be divided into sub-PUs, where each sub-PU contains one set of motion information. When a PU is split into multiple sub-PUs, each sub-PU can be motion compensated separately. For example, a sub-PU process can be applicable to temporal motion vector prediction and it is called Advanced Temporal Motion Vector Prediction (ATMVP).

Aspects of sub-blocks will now be discussed. In post filtering processes, such as deblocking, decoding processes can apply in a way that it does not fully follow the structure of PU, but the sizes of the minimum blocks to be processed. Such minimum processing blocks are called sub-blocks. A sub-block can be with square or non-square shape. A sub-block is typically belongs to a PU and therefore the sub-block size is smaller than or equal to the size of the smallest PU.

Figure 7A:
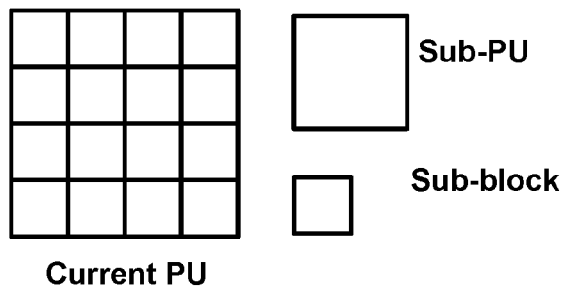
FIGS. 7A-7C show sub-PUs and sub-blocks in a PU.
Figure 7B:
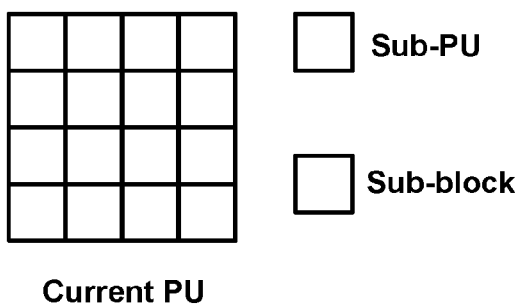
Figure 7C:
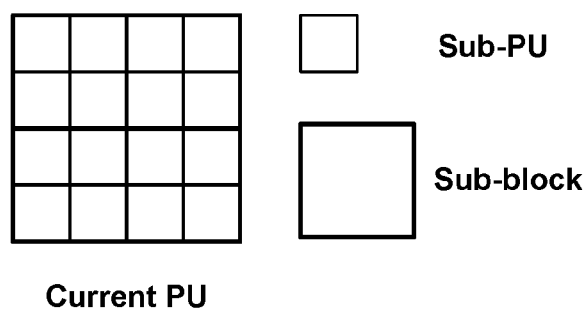

An example is illustrated in FIGS. 7A-7C to show the relationship between sub-PU and sub-block. As can be seen, sub-block size can be smaller than (FIG. 7A), same with (FIG. 7B) or larger than (FIG. 7C) sub-PU size.

Previously proposed and current techniques may have some limitations. As one example, existing OBMC methods for HEVC are mainly performed on a PU, macroblock, or sub-macroblock boundary. As another example, it is not clear how to use the motion information of other CUs to predict the current PU in OBMC. As another example, when the current PU contains sub-PUs, the PU-based OBMC methods may not work efficiently. To potentially address the problems and limitations identified above, this disclosure introduces several techniques. The techniques of this disclosure may be applied individually, or alternatively, any combination of them may be applied. As used herein, reference information may be regarded as a part of motion information in this disclosure.

The techniques described below are used for overlapped block motion compensation (OBMC). In some examples, as described herein, OBMC may refer to any process involving the use of motion information from one or more blocks neighboring the current block and performing a weighted average to generate the prediction block of the current block. In such examples, the OBMC may be performed on a boundary, a portion of a block, a slice of a block, or a whole block. In other examples, as described herein, OBMC may refer to any process involving the use of a weighted average of (i) the prediction block(s) based on motion information from one or more blocks neighboring the current block, and (ii) the prediction block based on motion information of the current block. In such examples, the OBMC may be performed on a boundary, a portion of a block, a slice of a block, or a whole block. In other examples, as described herein, OBMC may refer to generating multiple motion vectors from the current block and one or more neighboring blocks, and combining (e.g., averaging) them for the current block.

A first technique of this disclosure is sub-block based OBMC. Under this first technique, video encoder 20 and/or video decoder 30 may be configured to perform OBMC for each sub-block within a PU or CU (e.g., the current PU or CU). For example, video encoder 20 and/or video decoder 30 may be configured to perform OBMC for each sub-block within a PU or CU instead of being configured to only perform OBMC to smooth out a PU boundary. As described above, in some examples, a sub-block may refer to a sub-block of a PU; and, in such examples, the sub-block size may be smaller than or equal to the size of the smallest PU. In other examples, a sub-block may refer to something different than a sub-block of a PU. For example, a sub-block may refer to a sub-block of a CU. The size of a sub-block is discussed in more detail below. In accordance with this first technique and according to some examples, video encoder 20 and/or video decoder 30 may be configured to perform OBMC by using the motion information of sub-blocks that neighbor the current sub-block being encoded and/or decoded.

In accordance with this first technique and other examples, video encoder 20 and/or video decoder 30 may be configured to determine that one or more sub-blocks neighboring the current sub-block belong to a not decoded CU. In some examples, a "not decoded" CU may refer to a CU that has not yet been decoded by video encoder 20 and/or video decoder 30 when the current sub-block is being decoded by video encoder 20 and/or video decoder 30. In such examples, a CU received by video decoder 30 that has not yet been decoded by video decoder 30 may be referred to as a "not decoded" CU. For example, video decoder 30 may be configured to decode a plurality of blocks according to a scan order, and the not decoded CU may be positioned in the scan order such that the not-decoded CU will be decoded sometime after the current sub-block. Based on determining that the one or more neighboring sub-blocks belong to a not decoded CU, video encoder 20 and/or video decoder 30 may be configured to determine that the one or more neighboring sub-blocks belonging to the not decoded CU are unavailable for sub-block based OBMC. In such examples, video encoder 20 and/or video decoder 30 may be configured to perform OBMC for the current sub-block by not using (e.g., excluding) motion information of the one or more neighboring sub-blocks determined to be unavailable.

In other examples, video encoder 20 and/or video decoder 30 may be configured to determine that one or more sub-blocks neighboring the current sub-block belong to a not decoded LCU. In some examples, a "not decoded" LCU may refer to a LCU that has not yet been decoded by video encoder 20 and/or video decoder 30 when the current sub-block is being decoded by video encoder 20 and/or video decoder 30. In such examples, a LCU received by video decoder 30 that has not yet been decoded by video decoder 30 may be referred to as a "not decoded" LCU. For example, video decoder 30 may be configured to decode a plurality of blocks according to a scan order, and the not decoded LCU may be positioned in the scan order such that the not-decoded LCU will be decoded sometime after the current sub-block. Based on determining that the one or more neighboring sub-blocks belong to a not decoded LCU, video encoder 20 and/or video decoder 30 may be configured to determine that the one or more neighboring sub-blocks belonging to the not decoded LCU are unavailable for sub-block based OBMC. In such examples, video encoder 20 and/or video decoder 30 may be configured to perform OBMC for the current sub-block by not using (e.g., excluding) motion information of the one or more neighboring sub-blocks determined to be unavailable.

In other examples, video encoder 20 and/or video decoder 30 may be configured to determine that one or more sub-blocks neighboring the current sub-block belong to a not decoded PU. In some examples, a "not decoded" PU may refer to a PU that has not yet been decoded by video encoder 20 and/or video decoder 30 when the current sub-block is being decoded by video encoder 20 and/or video decoder 30. In such examples, a PU received by video decoder 30 that has not yet been decoded by video decoder 30 may be referred to as a "not decoded" PU. For example, video decoder 30 may be configured to decode a plurality of blocks according to a scan order, and the not decoded PU may be positioned in the scan order such that the not-decoded PU will be decoded sometime after the current sub-block. Based on determining that the one or more neighboring sub-blocks belong to a not decoded PU, video encoder 20 and/or video decoder 30 may be configured to determine that the one or more neighboring sub-blocks belonging to the not decoded PU are unavailable for sub-block based OBMC. In such examples, video encoder 20 and/or video decoder 30 may be configured to perform OBMC for the current sub-block by not using (e.g., excluding) motion information of the one or more neighboring sub-blocks determined to be unavailable.

In other examples, video encoder 20 and/or video decoder 30 may be configured to determine that one or more sub-blocks neighboring the current sub-block belong to a not decoded sub-block. In some examples, a "not decoded" sub-block may refer to a sub-block that has not yet been decoded by video encoder 20 and/or video decoder 30 when the current sub-block is being decoded by video encoder 20 and/or video decoder 30. In such examples, a sub-block received by video decoder 30 that has not yet been decoded by video decoder 30 may be referred to as a "not decoded" sub-block. For example, video decoder 30 may be configured to decode a plurality of blocks according to a scan order, and the not decoded sub-block may be positioned in the scan order such that the not-decoded sub-block will be decoded sometime after the current sub-block. Based on determining that the one or more neighboring sub-blocks belong to a not decoded sub-block, video encoder 20 and/or video decoder 30 may be configured to determine that the one or more neighboring sub-blocks belonging to the not decoded sub-block are unavailable for sub-block based OBMC. In such examples, video encoder 20 and/or video decoder 30 may be configured to perform OBMC for the current sub-block by not using (e.g., excluding) motion information of the one or more neighboring sub-blocks determined to be unavailable.

In accordance with this first technique, the size of a sub-block may equal the smallest PU size for a CU. In other examples, a sub-block may have a size smaller than the smallest PU size. For example, N×N may represent the smallest motion block size and the sub-block size (e.g., sub-PU size) may equal N×N, where N is a positive integer. In such an example, if the smallest PU size is either 8×4 or 4×8, the sub-block size may equal 4×4. In another example, N×M may represent the smallest motion block size and the sub-block size (e.g., sub-PU size) may be set to N×M, where M and N are positive integers and may or may not equal each other. In such an example, if the smallest PU size is 8×8, the sub-block size may equal 4×4, 8×4, or 4×8.

In another example, the size of the sub-block may also be any pre-defined value. The pre-defined sub-block size may, for example, be larger than the smallest PU size. In another example, the size of a sub-block may be signaled in a parameter set. In yet another example, the size of the sub-block may depend on the current PU or CU size (i.e., the current PU or CU to which the current sub-block belongs). In yet another example, the size of the sub-block may depend on the block size on which video encoder 20 and/or video decoder 30 are configured to perform OBMC. In yet another example, the size of the sub-block may depend on the current PU or CU size (i.e., the current PU or CU to which the current sub-block belongs) as well as the size of one or more neighboring PUs or CUs (i.e., one or more PUs or CUs that neighbor the PU or CU to which the current sub-block belongs).

A second technique of this disclosure is sub-PU based OBMC. Under this second technique, video encoder 20 and/or video decoder 30 may be configured to perform OBMC for each sub-PU within a PU or CU (e.g., the current PU or CU) that is coded with a sub-PU. Each sub-PU may contain its own set of motion information, e.g., including a motion vector and reference picture list index. In some examples, video encoder 20 and/or video decoder 30 may be configured to perform OBMC for one or more sub-PUs within the current PU or CU using motion information of one or more neighboring sub-PUs within the PU or CU. In other examples, video encoder 20 and/or video decoder 30 may be configured to perform OBMC for one or more sub-PUs within the current PU or CU using motion information of one or more neighboring sub-PUs within the current PU or CU together with motion information of one or more neighboring blocks outside the current PU or CU.

In accordance with this second technique and some examples, for each sub-PU, its neighboring blocks may be the neighboring sub-PUs within the same PU or CU (e.g., the current PU or CU) and neighboring blocks outside the current PU or CU (i.e., the current PU or current CU). In other examples, video encoder 20 and/or video decoder 30 may be configured to use a neighboring block outside the current PU or CU (i.e., outside the current PU or outside the current CU) to perform OBMC on the current sub-PU of the current PU or CU if the neighboring block has the same size as the current sub-PU. In such examples, even if a neighboring block to the current PU or CU contains more than one set of motion information, video encoder 20 and/or video decoder 30 may be configured to utilize only one set of motion information for that neighboring block. Also in such examples, if a neighboring block outside the current PU or CU has a size different from the size of the current sub-PU, video encoder 20 and/or video decoder 30 may be configured to perform OBMC for the current sub-PU by not using (e.g., excluding) motion information of the one or more neighboring blocks determined to have a size different from the size of the current sub-PU.

In other examples, video encoder 20 and/or video decoder 30 may be configured to use a neighboring block outside the current PU or CU to perform OBMC on the current sub-PU of the current PU or CU if the neighboring block is smaller than the size of the current sub-PU. In such examples, video encoder 20 and/or video decoder 30 may be configured to perform OBMC for the current sub-PU by using one or more sub-blocks for the current sub-PU. In some examples, video encoder 20 and/or video decoder 30 may be configured to divide any boundary sub-PUs of a PU into sub-blocks. In such examples, video encoder 20 and/or video decoder 30 may be configured to perform OBMC for each sub-block.

In other examples, a sub-PU that is not adjacent to any pixel outside the current PU or CU may be predicted using only neighboring sub-PUs. In such examples, video encoder 20 and/or video decoder 30 may be configured to determine the current sub-PU is not adjacent to any pixel outside the current PU or CU, and may be configured to perform OBMC for the current sub-PU using only neighboring sub-PUs.

Also in accordance with the second technique of this disclosure and in some examples, video encoder 20 and/or video decoder 30 may be configured to determine that one or more neighboring blocks to the current sub-PU belong to a not decoded CU. Based on determining that the one or more neighboring blocks belong to a not decoded CU, video encoder 20 and/or video decoder 30 may be configured to determine that the one or more neighboring blocks belonging to the not decoded CU are unavailable for sub-PU based OBMC. In such examples, video encoder 20 and/or video decoder 30 may be configured to perform OBMC for the current sub-PU by not using (e.g., excluding) motion information of the one or more neighboring blocks determined to be unavailable.

Also in accordance with the second technique of this disclosure and in some examples, video encoder 20 and/or video decoder 30 may be configured to determine that one or more neighboring blocks to the current sub-PU belong to a not decoded LCU. Based on determining that the one or more neighboring blocks belong to a not decoded LCU, video encoder 20 and/or video decoder 30 may be configured to determine that the one or more neighboring blocks belonging to the not decoded LCU are unavailable for sub-PU based OBMC. In such examples, video encoder 20 and/or video decoder 30 may be configured to perform OBMC for the current sub-PU by not using (e.g., excluding) motion information of the one or more neighboring blocks determined to be unavailable.

Also in accordance with the second technique of this disclosure and in some examples, video encoder 20 and/or video decoder 30 may be configured to determine that one or more neighboring blocks to the current sub-PU belong to a not decoded PU (e.g., an encoded PU). Based on determining that the one or more neighboring blocks belong to a not decoded PU, video encoder 20 and/or video decoder 30 may be configured to determine that the one or more neighboring blocks belonging to the not decoded PU are unavailable for sub-PU based OBMC. In such examples, video encoder 20 and/or video decoder 30 may be configured to perform OBMC for the current sub-PU by not using (e.g., excluding) motion information of the one or more neighboring blocks determined to be unavailable.

A third technique of this disclosure is CU-boundary based OBMC. Under this third technique, video encoder 20 and/or video decoder 30 may be configured to perform OBMC for one or more CU boundaries. In such examples, video encoder 20 and/or video decoder 30 may be configured to also perform OBMC for one or more PU boundaries.

Referring to the top and left boundaries of a current CU, video encoder 20 and/or video decoder 30 may be configured to use motion information of one or more neighboring blocks not belonging to the current CU but bordering the top and/or left boundary (e.g., edge) of the current CU to generate additional predictors in a way similar to that described herein with respect to the first technique. For example, video encoder 20 and/or video decoder 30 may be configured to perform OBMC for a CU boundary (e.g., the current CU boundary) by using all or some of the motion information of the blocks on the CU boundary (e.g., the top and/or left boundary of the current CU) from the neighboring block(s) (e.g., a neighboring CU) to the left of the current CU and/or the neighboring block(s) (e.g., a neighboring CU) to the top of the current CU.

In such an example, video encoder 20 and/or video decoder 30 may be configured to perform OBMC for a CU boundary as follows: For each smallest block of the current CU located on the top CU boundary, video encoder 20 and/or video decoder 30 may be configured to use motion information of each smallest block's top neighboring block for OBMC of the top CU boundary, and the additional predictor(s) are used to form the final prediction signal of the current block with the CU. For each smallest block of the current CU located on the left CU boundary, video encoder 20 and/or video decoder 30 may be configured to use motion information of each smallest block's left neighboring block for OBMC of the left CU boundary, and the additional predictor(s) are used to form the final prediction signal of the current block.

In some examples, video encoder 20 and/or video decoder 30 may be configured to perform OBMC only on left CU and/or top CU boundaries. In other examples, video encoder 20 and/or video decoder 30 may be configured to perform OBMC on left CU, top CU, right CU, and/or bottom CU boundaries. In such examples, video encoder 20 and/or video decoder 30 may be configured to perform OBMC on right CU and/or bottom CU boundaries in a similar manner as described above with respect to left and top CU boundaries. For example, for each smallest block of the current CU located on the right CU boundary, video encoder 20 and/or video decoder 30 may be configured to use motion information of each smallest block's top neighboring block for OBMC of the right CU boundary, and the additional predictor(s) are used to form the final prediction signal of the current block with the CU. For each smallest block of the current CU located on the bottom CU boundary, video encoder 20 and/or video decoder 30 may be configured to use motion information of each smallest block's bottom neighboring block for OBMC of the bottom CU boundary, and the additional predictor(s) are used to form the final prediction signal of the current block with the CU.

In some examples, video encoder 20 and/or video decoder 30 may be configured to subsample or compress motion information from a neighboring CU. In such examples, video encoder 20 and/or video decoder 30 may be configured to use the sub sampled or compressed motion information of the neighboring CU to generate one or more additional predictors of the current CU. For example, video encoder 20 and/or video decoder 30 may be configured to subsample or compress motion information of a neighboring CU on the basis of sub-block instead of smallest block size, meaning that if a neighboring CU has multiple sub-blocks (e.g., PU's) with individual MV's, video encoder 20 and/or video decoder 30 may be configured to use a single MV for one group (e.g., set) of PU's and another single MV for another group of PU's.

In some examples, video encoder 20 and/or video decoder 30 may be configured to disable OBMC relating to the third technique of this disclosure and/or another technique of this disclosure. For example, video encoder 20 and/or video decoder 30 may be configured to disable OBMC for PUs within a current CU if (e.g., when) the size of the current CU is smaller than that of the sub-block size. In such an example, video encoder 20 and/or video decoder 30 may be configured to determine the size of the current CU and compare the determined size of the current CU to the size of the sub-block to determine whether the size of the current CU is smaller than that of the sub-block size. Based on determining that the size of the current CU is smaller than the sub-block size, video encoder 20 and/or video decoder 30 may be configured to disable OBMC for PUs within a current CU.

As another example, video encoder 20 and/or video decoder 30 may be configured to disable OBMC for a PU boundary if (e.g., when) the PU boundary is not a sub-block boundary (e.g., a boundary not containing any sub-blocks). In this example, the sub-block is larger than the PU and the PU boundary may be located inside a sub-block. The PU boundary may or may not be a sub-block boundary. Accordingly, video encoder 20 and/or video decoder 30 may be configured to disable (e.g., skip) OBMC along that PU boundary to reduce encoding and/or decoding complexity. As another example, video encoder 20 and/or video decoder 30 may be configured to disable OBMC for right CU and/or bottom CU boundaries.

A fourth technique of this disclosure includes common aspects to the above three described first, second, and third OBMC techniques. In some examples, video encoder 20 and/or video decoder 30 may be configured to use motion vector of a neighboring sub-block, neighboring sub-PU, or neighboring block to respectively generate an additional predictor of the current sub-block, current sub-PU, or current block. In such examples, video encoder 20 and/or video decoder 30 may be configured to use the additional predictor to respectively form the final prediction signal of the current sub-block, current sub-PU, or current block.

In accordance with this fourth technique and other examples, video encoder 20 and/or video decoder 30 may be configured to use up to a predefined number of neighbors of a current sub-block, current sub-PU, or current block for OBMC. In such examples, the predefined number may be eight or a number different than eight. According to one example, video encoder 20 and/or video decoder 30 may be configured to use motion information (e.g., motion vectors) of four connected neighbor blocks (e.g., above, below, left, and right neighboring sub-blocks) for OBMC. As used herein, referring to "for OBMC" may refer to "to perform OBMC."

In some examples, video encoder 20 and/or video decoder 30 may be configured to select only one set of motion information if (e.g., when) a neighboring sub-block, neighboring sub-PU, or neighboring block contains multiple sets of motion information. For example, if a sub-block size is 8×8 and the motion information is stored on a 4×4 basis, video encoder 20 and/or video decoder 30 may be configured to only select one set of motion information corresponding to the 8×8 sub-block in this particular example.

Video encoder 20 and/or video decoder 30 may be configured to select a single set of motion information according to one or more techniques. In one example, video encoder 20 and/or video decoder 30 may be configured to select the set of motion information based on the center pixel of the sub-block, sub-PU, or block. For example, video encoder 20 and/or video decoder 30 may be configured to select the set of motion information for a sub-block, sub-PU, or block that includes the center pixel of the sub-block, sub-PU, or block. Hence, if there are multiple sets of motion information for a PU, the single set of motion information for a block containing a center pixel may be used for OBMC for the current block. In another example, video encoder 20 and/or video decoder 30 may be configured to select the set of motion information based on which set of motion information belongs to the smallest motion blocks adjacent to the current sub-block, sub-PU, or block. For example, video encoder 20 and/or video decoder 30 may be configured to select the set of motion information that belongs to the smallest motion blocks adjacent to the current sub-block, sub-PU, or block. If there is a plurality of such motion blocks, video encoder 20 and/or video decoder 30 may be configured to select the earliest (or first-decoded) motion block of the plurality in, for example, raster scan order.

In another example, video encoder 20 and/or video decoder 30 may be configured to compare all the motion information of the neighboring sub-blocks to the motion information of the current PU, CU, or block. Based upon this comparison, video encoder 20 and/or video decoder 30 may be configured to select the motion information that is most similar to the motion information of the current PU, CU, or block. Based upon this comparison, video encoder 20 and/or video decoder 30 may be configured to select the motion information that is most dissimilar to the motion information of the current PU, CU, or block.

In some examples, video encoder 20 and/or video decoder 30 may be configured to use motion information of a subset of any connected neighboring sub-blocks, sub-PUs, or blocks for OBMC. In example, video encoder 20 and/or video decoder 30 may be configured to use only the left and right neighbors of a current block to perform OBMC. In another example, video encoder 20 and/or video decoder 30 may be configured to use only the above and below neighbors of a current block to perform OBMC. In another example, video encoder 20 and/or video decoder 30 may be configured to use only one of the above or below neighbors and one of the left or right neighbors of a current block to perform OBMC. In another example, video encoder 20 and/or video decoder 30 may be configured to use only one of the four connected neighbors of a current block to perform OBMC. In yet another example, video encoder 20 and/or video decoder 30 may be configured to select the subset of the neighboring blocks based on the relative position of the sub-block within the current PU or CU.

Video encoder 20 and/or video decoder 30 may be configured to determine that a neighboring sub-block, sub-PU, or block is unavailable according to one or more techniques described herein. For example, an Intra block may be considered as unavailable, a block outside (or partially outside) the current slice or tile may be considered as unavailable, a block that is considered unavailable when wavefront is used may be considered as unavailable, a block that is not decoded yet (e.g., at least its motion vectors are not decoded yet) may be considered unavailable, and/or a neighboring block or sub-block may be considered unavailable when the neighboring block or sub-block does not belong to the current CTU.

According to a fifth technique of this disclosure, video encoder 20 and/or video decoder 30 may be configured to perform OBMC for the current sub-block using motion information (e.g., motion vectors) of each available neighboring sub-block to generate a prediction block. In some examples, the prediction block may be denoted by $P_N$ with N indicating an index/denotation (e.g., equal to above, below, left or right) to a neighboring block that neighbors the current sub-block. Video encoder 20 and/or video decoder 30 may be configured to use the prediction block(s) of one or more neighboring blocks to update the prediction block of the current sub-block, which may be denoted by $P_C$. For example, video encoder 20 and/or video decoder 30 may be configured to generate the final prediction block of the current block (i.e., the updated prediction block of the current sub-block), which may be a weighted average of (i) the prediction block(s) based on motion information from one or more blocks neighboring the current block, and (ii) the prediction block based on motion information of the current sub-block.

In some examples, video encoder 20 and/or video decoder 30 may be configured to determine if (e.g., when) one or more neighboring sub-blocks to the current block contain more than one sub-PU, which may be indicative of multiple sets of motion information. In such examples, based on determining that one or more neighboring sub-blocks to the current sub-block contain more than one sub-PUs, video encoder 20 and/or video decoder 30 may be configured to use motion information of one or more of such sub-PUs that neighbor the current sub-block to perform OBMC on the current sub-block. For example, video encoder 20 and/or video decoder 30 may be configured to not use or otherwise exclude motion information from a sub-PU that does not neighbor the current sub-block. In other examples, video encoder 20 and/or video decoder 30 may be configured to use motion information of any sub-PU of a neighboring block to the current sub-block to perform OBMC on the current sub-block, whether or not any sub-PU of the neighboring block neighbors the current sub-block.

According to a sixth technique of this disclosure, video encoder 20 and/or video decoder 30 may be configured to perform OBMC on any block (e.g., a PU or CU) with a square or non-square size (e.g., a rectangle). In other examples, video encoder 20 and/or video decoder 30 may be configured to perform OBMC on a block (e.g., a CU or PU) with special types or sizes (e.g., predefined types or sizes, PUs coded with merge mode in HEVC, PUs coded with a mode similar to merge mode in a coding standard different from HEVC, or PUs larger than 32×32).

According to a seventh technique of this disclosure, video encoder 20 and/or video decoder 30 may be configured to perform OBMC for the current sub-block, sub-PU, or block using motion information (e.g., motion vectors) of each available neighboring sub-block, sub-PU, or block to generate a prediction block. In some examples, the prediction block may be denoted by $P_N$ with N indicating an index/denotation (e.g., equal to above, below, left or right) to a neighboring block that neighbors the current sub-block, sub-PU, or block. Video encoder 20 and/or video decoder 30 may be configured to use the prediction block(s) of one or more neighboring blocks to update the prediction block of the current block (e.g., sub-block, sub-PU, or block), which may be denoted by $P_C$.

In some examples, video encoder 20 and/or video decoder 30 may be configured to perform a weighted average to update $P_C$. In such examples, video encoder 20 and/or video decoder 30 may be configured to perform a weighted average of (i) one or more K row(s) or column(s) of the prediction block $P_N$ from the motion information (e.g., motion vector(s)) of the neighboring block, and (ii) the corresponding row(s) or column(s) of the current prediction block $P_C$ to update $P_C$. In some examples, video encoder 20 and/or video decoder 30 may be configured to assign different weights to different positions (e.g., different row(s) or column(s)). In some examples, K may be set equal to a value of 1, 2, 3, or 4. The one or more K row(s) or column(s) are those closest to the neighboring block as indicated by N. For example, if the neighboring block is a left-neighboring block or a right-neighboring block to the current block, then video encoder 20 and/or video decoder 30 may be configured to perform a weighted average of (i) one or more K column(s) of the prediction block $P_N$ from the motion information (e.g., motion vector(s)) of the neighboring block, and (ii) the corresponding column(s) of the current prediction block $P_C$ to update $P_C$. As another example, if the neighboring block is a top-neighboring block or a bottom-neighboring block to the current block, then video encoder 20 and/or video decoder 30 may be configured to perform a weighted average of (i) one or more K row(s) of the prediction block $P_N$ from the motion information (e.g., motion vector(s)) of the neighboring block, and (ii) the corresponding row(s) of the current prediction block $P_C$ to update $P_C$.

Referring to Table 1 below, x and y may denote the vertical and horizontal coordinates relative to the top-left pixel of the current sub-block, sub-PU, or block. The weight of $P_C(x, y)$ and $P_N(x, y)$ is respectively denoted as $w1(x, y)$ and $w2(x, y)$. In some examples, video encoder 20 and/or video decoder 30 may be configured to perform a weighted average to update $P_C$ such that the updated $P_C(x, y)$ equals $w1(x, y)*P_C(x, y)+w2(x, y)*P_N(x, y)$. The width and height of the current sub-block, sub-PU, or block may be respectively denoted by W and H. For example, W−1 may refer to the last column (e.g., the column furthest to the right) of the current sub-block, sub-PU, or block. As another example, H−1 may refer to the last row (e.g., the bottom most row) of the current sub-block, sub-PU, or block. As another example, H−2 may refer to the second-to-last row (e.g., the second bottom most row, which may be described as the first row above the last row) of the current sub-block, sub-PU, or block. The values of N may refer to the N of the prediction block $P_N$ described herein. One example of weights w1 and w2 is specified in Table 1 below.

TABLE 1

(Example Weights Used In OBMC):

| Superimposed positions | | w1 | w2 |
|---|---|---|---|
| N = above | [(0, y)] | [³⁄₄] | [¹⁄₄] |
| y = 0 . . . W-1 | (1, y) | ⁷⁄₈ | ¹⁄₈ |
| | (2, y) | ¹⁵⁄₁₆ | ¹⁄₁₆ |
| | (3, y) | ³¹⁄₃₂ | ¹⁄₃₂ |

TABLE 1-continued (Example Weights Used In OBMC):

| Superimposed positions | | w1 | w2 |
|---|---|---|---|
| N = below | [(H-1, y)] | [3/4] | [1/4] |
| y = 0 . . . W-1 | (H-2, y) | 7/8+12 | 1/8 |
| | (H-3, y) | 15/16 | 1/16 |
| | (H-4, y) | 31/32 | 1/32 |
| N = left | [(x, 0)] | [3/4] | [1/4] |
| x = 0 . . . H-1 | (x, 1) | 7/8 | 1/8 |
| | (x, 2) | 15/16 | 1/16 |
| | (x, 3) | 31/32 | 1/32 |
| N = right | [(x, W-1)] | [3/4] | [1/4] |
| x = 0 . . . H-1 | (x, W-2) | 7/8 | 1/8 |
| | (x, W-3) | 15/16 | 1/16 |
| | (x, W-4) | 31/32 | 1/32 |

In some examples, when N is equal to above, video encoder 20 and/or video decoder 30 may be configured to perform a weighted average such that the top four rows of $P_C$ are updated by $P_N$. Similarly, when N is equal to below, video encoder 20 and/or video decoder 30 may be configured to perform a weighted average such that the bottom four rows of $P_C$ are updated by $P_N$. As another example, when N is equal to left, video encoder 20 and/or video decoder 30 may be configured to perform a weighted average such that the left four columns of $P_C$ are updated by $P_N$. Similarly, when N is equal to right, video encoder 20 and/or video decoder 30 may be configured to perform a weighted average such that the right four columns of $P_C$ are updated by $P_N$.

In other examples, video encoder 20 and/or video decoder 30 may be configured to update one row or column of $P_C$ by $P_N$. Positions and weights according to such examples are [bracketed] in Table 1 above.

In other examples, video encoder 20 and/or video decoder 30 may be configured to update two rows or columns of $P_C$ by $P_N$. Positions and weights of the two rows or columns according to such examples are [bracketed] and singleunderlined in Table 1 above (e.g., the first/top two rows for each N value).

In other examples, video encoder 20 and/or video decoder 30 may be configured to update three rows or columns of $P_C$ by $P_N$. Positions and weights of the three rows or columns according to such examples are [bracketed], singleunderlined, and doubleunderlined in Table 1 above (e.g., the first/top three rows for each N value).

In other examples, video encoder 20 and/or video decoder 30 may be configured to select the number of rows (e.g., one or more rows) or the number columns (e.g., one or more columns) based on the size of the current sub-block, sub-PU, or block. For example, video encoder 20 and/or video decoder 30 may be configured to select more rows or columns if the current sub-block, sub-PU, or block has a first size, and select less rows or columns if the current sub-block, sub-PU, or block has a second size. For example, when the current PU size is equal to 8×4 or 4×8 and/or the current PU is coded with sub-PU modes (e.g., meaning that the current PU includes one or more sub-PUs), video encoder 20 and/or video decoder 30 may be configured to update only two rows or columns of $P_C$ by $P_N$. As another example, when the current PU size is greater than 8×4 or 4×8, video encoder 20 and/or video decoder 30 may be configured to update four rows or columns of $P_C$ by $P_N$.

In yet other examples, video encoder 20 and/or video decoder 30 may be configured to update every pixel of $P_C$ by the corresponding pixel of $P_N$.

In some examples, video encoder 20 and/or video decoder 30 may be configured to implement weights used in any weighted average by using one or more addition and shift operations. In such examples or other examples, video encoder 20 and/or video decoder 30 may be configured to implement the weights (e.g., the weights shown in Table 1 or weights different from the weights shown in Table 1) such that w1(x, y)+w2(x, y) is equal to 1.

In some examples, the row or column number of $P_C$ updated by $P_N$ may depend on (e.g., be based on) the size of the current prediction block. In such examples, the size of the current prediction block may correspond to the size of the sub-block, sub-PU, PU, or CU. In some examples, the row number of $P_C$ updated by $P_N$ may depend on W. For example, video encoder 20 and/or video decoder 30 may be configured to update more rows when H is larger (e.g., having a first value). As another example, video encoder 20 and/or video decoder 30 may be configured to update less rows when H is smaller (e.g., having a second value that is smaller than the first value). As another example, video encoder 20 and/or video decoder 30 may be configured to update columns rows when W is larger (e.g., having a first value). As another example, video encoder 20 and/or video decoder 30 may be configured to update less columns when W is smaller (e.g., having a second value that is smaller than the first value).

According to an eighth technique of this disclosure, when multiple neighbors provide multiple predictors with each being denoted as $P_N$, the composition of the predictors $P_N$ and the current predictor $P_C$ may be done one by one in an order. Here, a predictor may mean a prediction block that may consist of a block of pixel values determined by inter-prediction using motion information of the neighboring block. For example, after each composition, the current predictor $P_C$ may be updated and kept as the same bit depth as that of the current predictor before composition, which may be the internal processing bit depth of each color component. During each composition, the weighting process for each pixel may include a rounding value r, so that the weighting process is changed to $(a1(x, y)*P_C(x, y)+a2(x, y)*P_N(x, y)+r)/S$, wherein a1/S and a2/S are equal to w1 and w2 receptively. In some examples, r may be set to 0 or S/2. In this example, a1 is a quantized value of w1, a2 is a quantized value of w2, and S is the normalized factor.

In some examples, the order when four predictors are available may be Above, Left, Bottom, Right. In other examples, the order when four predictors are available may be Left, Above, Bottom, Right. In other examples, the order when four predictors are available may be any order different from the two examples above.

In some examples, video encoder 20 and/or video decoder 30 may be configured to skip the composition process if (e.g., when) a neighbor block does not contain motion information because this may indicate that $P_N$ is unavailable. In other examples, video encoder 20 and/or video decoder 30 may be configured to collect all predictors (e.g., all $P_N$) and perform a joint weighted prediction process using all predictors. In such examples, video encoder 20 and/or video decoder 30 may be configured to determine that one or more $P_N$ are unavailable, and may be configured to set the one or more $P_N$ determined to be unavailable equal to $P_C$.

In some examples, during each composition (e.g., while performing the weighted average process for each composition of prediction block(s) $P_N$), video encoder 20 and/or video decoder 30 may be configured to update the current predictor $P_C$ with the bit depth increasing. For example, video encoder 20 and/or video decoder 30 may be configured to update the current predictor $P_C$ without performing a de-scaling operation before the next composition is processed. Video encoder 20 and/or video decoder 30 may be configured to perform a de-scaling operation after all compositions have been processed. The descaling refers to the division by the normalization factor S set forth above, which may bring the weighted composition value to the same level of each input prediction. By de-scaling after all compositions have been processed, video decoder 30 may be configured to attain the same final prediction results by processing compositions sequentially and using a joint weighted prediction process. Such design may provide flexibility in the implementation when multiple boundary OBMC is applied to the same prediction block.

Accordingly to a ninth technique of this disclosure, video encoder 20 and/or video decoder 30 may be configured to adaptively enable or disable (e.g., switch on or off) OBMC at the CU, PU, or any other block level. For example, when OBMC is enabled for a particular block level, video encoder 20 and/or video decoder 30 may be configured to perform OBMC using one or more techniques described herein for that particular block level. As another example, when OBMC is disabled for a particular block level, video encoder 20 and/or video decoder 30 may be configured to not perform OBMC using one or more techniques described herein for that particular block level.

In some examples, video encoder 20 may be configured to adaptively enable or disable (e.g., switch on or off) OBMC at the CU, PU, or any other block level by signaling an OBMC flag. In some examples, video encoder 20 may be configured to signal, and video decoder 30 may be configured to receive, an OBMC syntax element such as an OBMC flag having a value that indicates whether OBMC is enabled or disabled for a particular block. For example, video encoder 20 may be configured to signal an OBMC flag for each inter-coded CU, PU, or block. In some examples, the OBMC flag may be binary and have one of two values. A first value of the OBMC flag may indicate that OBMC is enabled, and a second value of the OBMC flag may indicate that OBMC is disabled. For example, when the OBMC flag is true (e.g., has a value corresponding to a first value), OBMC applies (e.g., is enabled) for the current CU, PU, or block. As another example, when the OBMC flag is false (e.g., has a value corresponding to a second value), OBMC does not apply (e.g., is disabled) for the current CU, PU, or block.

Similarly, video decoder 30 may be configured to receive the OBMC flag and determine the value of the OBMC flag. For example, video decoder 30 may be configured to receive OBMC flag from video encoder 20 in a bitstream generated by video encoder 20. In some examples, the value corresponding to OBMC flag indicates whether OBMC for a block of video data being decoded (e.g., a CU, PU, or other block) is enabled or disabled. In such examples, video decoder 30 may be configured to receive an OBMC flag having a value that indicates whether OBMC is enabled or disabled for a particular block. For example, video decoder 30 may be configured to receive an OBMC flag for each inter-coded CU, PU, or block. A first value of the OBMC flag may indicate that OBMC is enabled, and a second value of the OBMC flag may indicate that OBMC is disabled. For example, when the OBMC flag is true (e.g., has a value corresponding to a first value), video decoder 30 may be configured to determine that OBMC applies (e.g., is enabled) for the current CU, PU, or block. As another example, when the OBMC flag is false (e.g., has a value corresponding to a second value, video decoder 30 may be configured to determine that OBMC does not apply (e.g., is disabled) for the current CU, PU, or block.

In some examples, video encoder 20 may be configured to signal an OBMC flag only for a CU, PU, or block based on the partition type(s) used for the CU, PU, or block, the prediction mode (e.g., merge mode or AMVP mode) used for the CU, PU, or block, or size of the CU, PU, or block. In such examples, video encoder 20 may be configured to determine the partition type(s), prediction mode, and/or size corresponding to the CU, PU, or block, and signal an OBMC flag based on the determination of one or more of: the partition type(s), prediction mode, and/or size corresponding to the CU, PU, or block.

In one example, video encoder 20 may be configured to signal an OBMC flag for a CU, PU, or block only if the CU, PU, or block is not coded with 2N×2N merge mode and the size of the CU, PU, or block is smaller than or equal to 16×16. In such an example, video encoder 20 may be configured to determine whether the CU, PU, or block is coded with 2N×2N merge mode and the size of the CU, PU, or block, and signal an OBMC flag based on the determination(s) thereof.

In some examples, video encoder 20 may be configured to not signal an OBMC flag for a CU, PU, or block. In such examples, video decoder 30 may be configured to implicitly derive, based on other signaled information (e.g., as described in the next four paragraphs as just one example of disclosure containing multiple examples), a value corresponding to the OBMC flag. For example, video decoder 30 may be configured to implicitly derive a value of the OBMC flag indicating that OBMC applies (e.g., is enabled) for the CU, PU, or block. As another example, video decoder 30 may be configured to implicitly derive a value of the OBMC flag indicating that OBMC does not apply (e.g., is disabled) for the CU, PU, or block.

According to a tenth technique of this disclosure, video encoder 20 and/or video decoder 30 may be configured to adaptively enable or disable (e.g., switch on or off) OBMC at the CU, PU, sub-block, or block boundary. For example, video encoder 20 and/or video decoder 30 may be configured to adaptively enable or disable (e.g., switch on or off) OBMC at the CU, PU, sub-block, or block boundary implicitly based on the characteristic of motion information (e.g., motion vectors) of one or more (e.g., two) neighboring blocks, and/or the characteristic of predicted sample values based on the motion information (e.g., motion vectors) of the one or more (e.g., two) neighboring blocks.

In some examples, whether to apply (e.g., enable) OBMC for a block boundary (e.g., a CU, PU, sub-block, or block boundary) may be based on the motion vector difference between the motion vectors of one or more (e.g., two) neighboring blocks that share a boundary with the current block. In such examples, video encoder 20 and/or video decoder 30 may be configured to determine the motion vector difference between the motion vectors of one or more (e.g., two) neighboring blocks that share a boundary with the current block. When the motion vector difference is above a threshold (e.g., 16 pixels or any other threshold), OBMC may not be applied (e.g., may be disabled) for the boundary (ies); otherwise, OBMC may be applied (e.g., enabled) for the boundary(ies). In such examples, video encoder 20 and/or video decoder 30 may be configured to compare the determined motion vector difference to the predefined threshold, and enable or disable OBMC for one or more boundaries based on the comparison. In some examples, the threshold may be a predefined value, and may or may not be signaled in an encoded video bitstream.

In an example where video encoder 20 and/or video decoder 30 may be configured to determine the motion vector difference between the motion vectors of two neighboring blocks, video encoder 20 and/or video decoder 30 may be configured to not apply (e.g., disable) OBMC if (e.g., when) two motion vectors each point to a different reference frame, or if (e.g., when) at least one motion vector is not available. In another example where video encoder 20 and/or video decoder 30 may be configured to determine the motion vector difference between the motion vectors of two or more neighboring blocks, video encoder 20 and/or video decoder 30 may be configured to not apply (e.g., disable) OBMC if (e.g., when) two or more motion vectors each point to a different reference frame, or if (e.g., when) at least one motion vector is not available.

In other examples, whether to apply (e.g., enable) OBMC for a block boundary (e.g., a CU, PU, sub-block, or block boundary) may be based on whether two motion vectors of two neighboring blocks (e.g., one motion vector for each of the two neighboring blocks) that share a boundary with the current block both point to integer pixel positions. In such examples, video encoder 20 and/or video decoder 30 may be configured to determine whether two motion vectors of two neighboring blocks (e.g., one motion vector for each of the two neighboring blocks) that share a boundary with the current block both point to integer pixel positions. In some examples, if both motion vectors point to integer pixel positions, video encoder 20 and/or video decoder 30 may be configured to not apply (e.g., disable) OBMC for the boundary(ies). In other examples, if both motion vectors do not point to integer pixel positions, video encoder 20 and/or video decoder 30 may be configured to apply (e.g., enable) OBMC for the boundary(ies).

In other examples, whether to apply (e.g., enable) OBMC for a block boundary (e.g., a CU, PU, sub-block, or block boundary) may be based on the sample value difference of two predicted blocks derived from two motion vectors of two neighboring blocks that share a boundary with the current block. For example, when the average absolute difference of the two predicted blocks is above a certain threshold (e.g., such as 80), video encoder 20 and/or video decoder 30 may be configured to not apply (e.g., disable) the OBMC for the boundary. As another example, when the maximal absolute difference between the samples of the two predicted block is above a certain threshold (e.g., such as 80, 88, or 96), video encoder 20 and/or video decoder 30 may be configured to not apply (e.g., disable) OBMC for the boundary. As another example, when the maximal absolute difference between the samples of the two predicted block is less than or equal to a certain threshold (e.g., such as 80, 88, or 96), video encoder 20 and/or video decoder 30 may be configured to apply (e.g., enable) OBMC for the boundary. In some examples, the threshold may be a predefined value, and may or may not be signaled in an encoded video bitstream. In these examples, the size of the predicted blocks may be (i) the same size as the sub-block size described in the fourth technique of this disclosure above, (ii), pre-defined, or (iii) signaled in a bitstream.

As used herein, disabling or not applying OBMC for a boundary may refer to not performing OBMC to the boundary, and vice versa. Similarly, as used herein, enabling or applying OBMC for a boundary may refer to performing OBMC to the boundary, and vice versa. As used herein, any reference concerning "for X" may refer to "to X" or "on X." For example, reference to "for a block" may refer to "to a block" or "on a block." It is understood that any reference concerning "for X," "to X," or "on X" may refer to any of "for X," "to X," and "on X." For example, reference to "on the sub-block" may likewise refer to "for the sub-block" or "to the sub-block."

According to an eleventh technique of this disclosure, video encoder 20 and/or video decoder 30 may be configured to adaptively enable or disable (e.g., switch on or off) OBMC at the CU, PU, sub-block, any other block level. For example, video encoder 20 and/or video decoder 30 may be configured to adaptively enable or disable (e.g., switch on or off) OBMC for each inter-coded CU, PU, sub-block, or block. In some examples, video encoder 20 and/or video decoder 30 may be configured to adaptively enable or disable (e.g., switch on or off) OBMC implementing one or more techniques described with respect to the ninth technique of this disclosure and one or more techniques described with respect to the tenth technique of this disclosure. For example, when the OBMC flag is signaled for a CU or PU, video decoder 30 may be configured to perform (e.g., enable or apply) or not perform (e.g., disable or not apply) OBMC based on the value of the OBMC flag. As another example, when the OBMC flag is not signaled for a CU or PU, video decoder 30 may be configured to perform (e.g., enable or apply) or not perform (e.g., disable or not apply) OBMC using one or more methods described above with respect to the tenth technique of this disclosure.

According to an twelfth technique of this disclosure, video encoder 20 and/or video decoder 30 may be configured to perform OBMC on all motion compensated (MC) block boundaries. In some examples video encoder 20 and/or video decoder 30 may be configured to perform OBMC on all motion compensated (MC) block boundaries except the right and bottom boundaries of a block (e.g., a CU). In some examples, video encoder 20 and/or video decoder 30 may be configured to perform OBMC on luma and/or chroma components.

In HEVC, a MC block corresponds to a PU. When a PU is coded with ATMVP mode in HEVC, each sub-PU (4×4) is a MC block. To process CU, PU, or sub-PU boundaries in a uniform fashion, video encoder 20 and/or video decoder 30 may be configured to perform OBMC according to one or more techniques described herein at the sub-block level for all MC block boundaries of the current block. In some examples, video encoder 20 and/or video decoder 30 may be configured to set the sub-block size equal to 4×4, as illustrated in FIG. 8.

In some examples, video encoder 20 and/or video decoder 30 may be configured to perform OBMC on the current sub-block. In such examples, video encoder 20 and/or video decoder 30 may be configured to derive one or more prediction blocks for the current sub-block. For example, video encoder 20 and/or video decoder 30 may be configured to derive four prediction blocks for the current sub-block using motion vectors of four connected neighboring sub-blocks (e.g., four sub-blocks that share a border with the current sub-block) if available. As another example, video encoder 20 and/or video decoder 30 may be configured to derive four prediction blocks for the current sub-block using motion vectors of four connected neighboring sub-blocks (e.g., four sub-blocks that share a border with the current sub-block) if they are available and are not identical to the current motion vector for the current block. Video encoder 20 and/or video decoder 30 may be configured to perform a weighted average on these multiple prediction blocks (e.g., the four prediction blocks based on the four connected neighboring sub-blocks) based on multiple motion vectors (e.g., one motion vector associated with each of the four prediction blocks, or two motion vectors associated with each of the four prediction blocks as described below). In some examples, video encoder 20 and/or video decoder 30 may be configured to perform a weighted average to generate the final prediction block of the current sub-block. For example, video encoder 20 and/or video decoder 30 may be configured to use multiple motion vectors to obtain multiple prediction samples, then apply a weighted average to the samples. The final prediction block may refer to a block of predicted pixels for pixels in the current sub-block. Note that the examples above in this paragraph apply to uni-directional prediction, but in examples involving bi-directional prediction, the prediction block in the examples above may be generated by using two motion vectors from each of the four neighboring blocks.

In some examples, the prediction block based on one or more motion vectors of a neighboring sub-block may be denoted as $P_N$, where N is an index to the neighboring sub-block. Otherwise stated, N identifies whether the prediction block is the above, below, left, or right neighboring sub-block. The prediction block based on one or more motion vectors of the current sub-block may be denoted as $P_C$. In some examples, every pixel of $P_N$ is added to the same pixel in $P_C$ (e.g., four rows and/or columns of $P_N$ are added to $P_C$). In such examples, video encoder 20 and/or video decoder 30 may be configured to use the weighting factors of $\{\frac{1}{4}, \frac{1}{8}, \frac{1}{16}, \frac{1}{32}\}$ for $P_N$, and the weighting factors of $\{\frac{3}{4}, \frac{7}{8}, \frac{15}{16}, \frac{31}{32}\}$ for $P_C$. To keep computational cost low for small MC blocks (e.g., where the PU size is equal to 8×4, 4×8, or a PU is coded with ATMVP mode), video encoder 20 and/or video decoder 30 may be configured to only add two rows and/or columns of $P_N$ to $P_C$. In such examples, video encoder 20 and/or video decoder 30 may be configured to apply weighting factors of $\{\frac{1}{4}, \frac{1}{8}\}$ for $P_N$ and weighting factor $\{\frac{3}{4}, \frac{7}{8}\}$ for $P_C$. For each $P_N$ generated based on one or more motion vectors of a vertical neighboring sub-block (e.g., top or bottom), video encoder 20 and/or video decoder 30 may be configured to add pixels in the same row of $P_N$ to $P_C$ with a same weighting factor. For each $P_N$ generated based on one or more motion vectors of a horizontal neighboring sub-block (e.g., left or right), video encoder 20 and/or video decoder 30 may be configured to add pixels in the same column of $P_N$ to $P_C$ with a same weighting factor.

Figure 9:
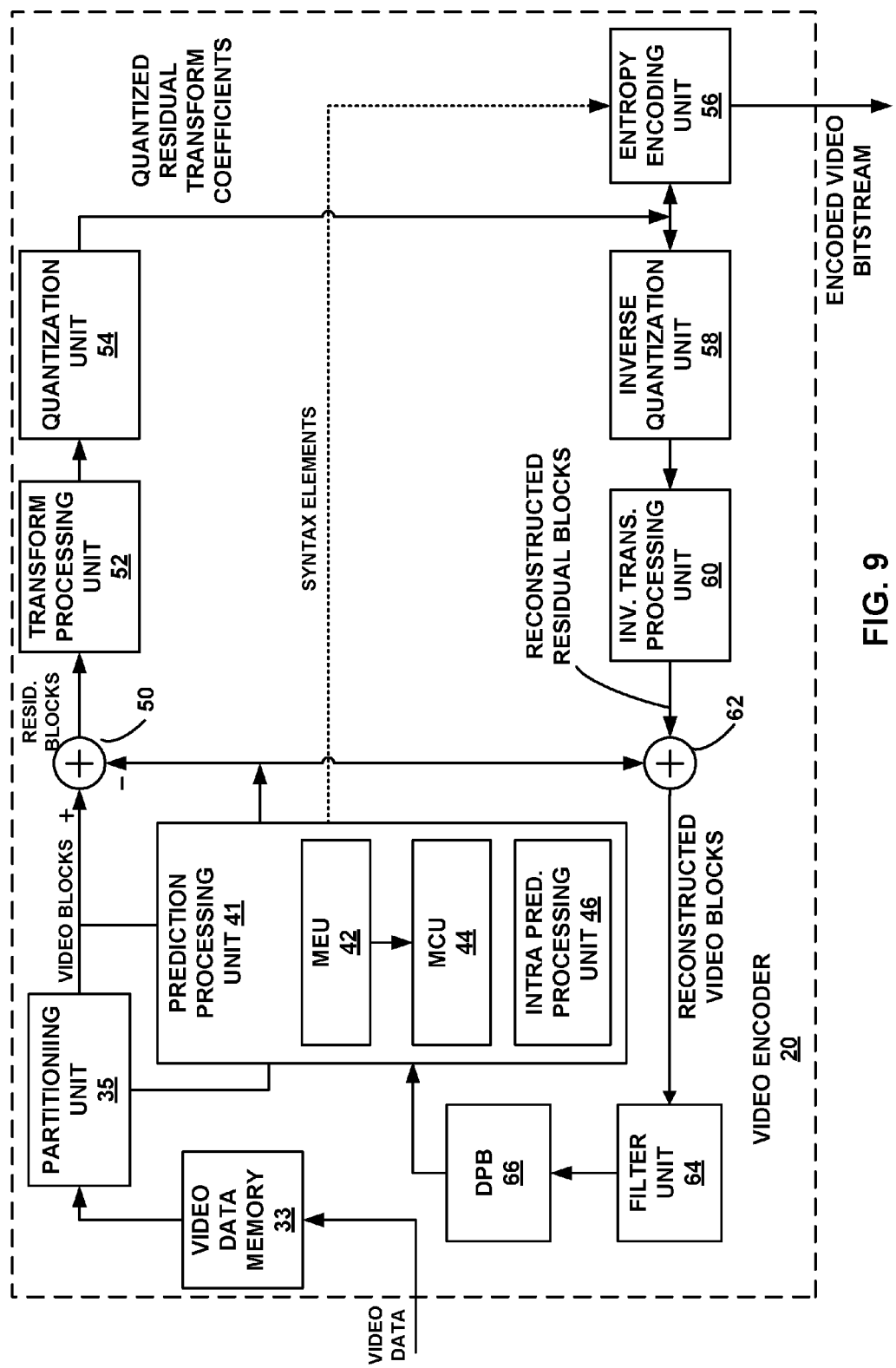
FIG. 9 is a block diagram illustrating an example video encoder that may implement OBMC techniques described in this disclosure.

FIG. 9 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 9, video encoder 20 includes a video data memory 33, partitioning unit 35, prediction processing unit 41, summer 50, transform processing unit 52, quantization unit 54, entropy encoding unit 56. Prediction processing unit 41 includes motion estimation unit (MEU) 42, motion compensation unit (MCU) 44, and intra prediction unit 46. For video block reconstruction, video encoder 20 also includes inverse quantization unit 58, inverse transform processing unit 60, summer 62, filter unit 64, and decoded picture buffer (DPB) 66. One or more components of FIG. 9 may perform one or more techniques described in this disclosure.

As shown in FIG. 9, video encoder 20 receives video data and stores the received video data in video data memory 33. Video data memory 33 may store video data to be encoded by the components of video encoder 20. The video data stored in video data memory 33 may be obtained, for example, from video source 18. DPB 66 may be a reference picture memory that stores reference video data for use in encoding video data by video encoder 20, e.g., in intra- or inter-coding modes. Video data memory 33 and DPB 66 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 66 may be provided by the same memory device or separate memory devices. In various examples, video data memory 33 may be on-chip with other components of video encoder 20, or off-chip relative to those components.

Partitioning unit 35 retrieves the video data from video data memory 33 and partitions the video data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 66. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 66. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After prediction processing unit 41 generates the predictive block for the current video block, either via intra prediction or inter prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed block.

Filter unit 64 filters the reconstructed block (e.g. the output of summer 62) and stores the filtered reconstructed block in DPB 66 for uses as a reference block. The reference block may be used by motion estimation unit 42 and motion compensation unit 44 as a reference block to inter-predict a block in a subsequent video frame or picture. Filter unit 64 may apply one or more of deblocking filtering, sample adaptive offset (SAO) filtering, adaptive loop filtering (ALF), or other types of loop filtering. Filter unit 64 may apply deblocking filtering to filter block boundaries to remove blockiness artifacts from reconstructed video and may apply other types of filtering to improve overall coding quality. Additional loop filters (in loop or post loop) may also be used.

Video encoder 20 represents an example of a video encoder configured to perform sub-block based OBMC, sub-PU based OBMC, CU-boundary based OBMC, or any combination thereof.

Figure 10:
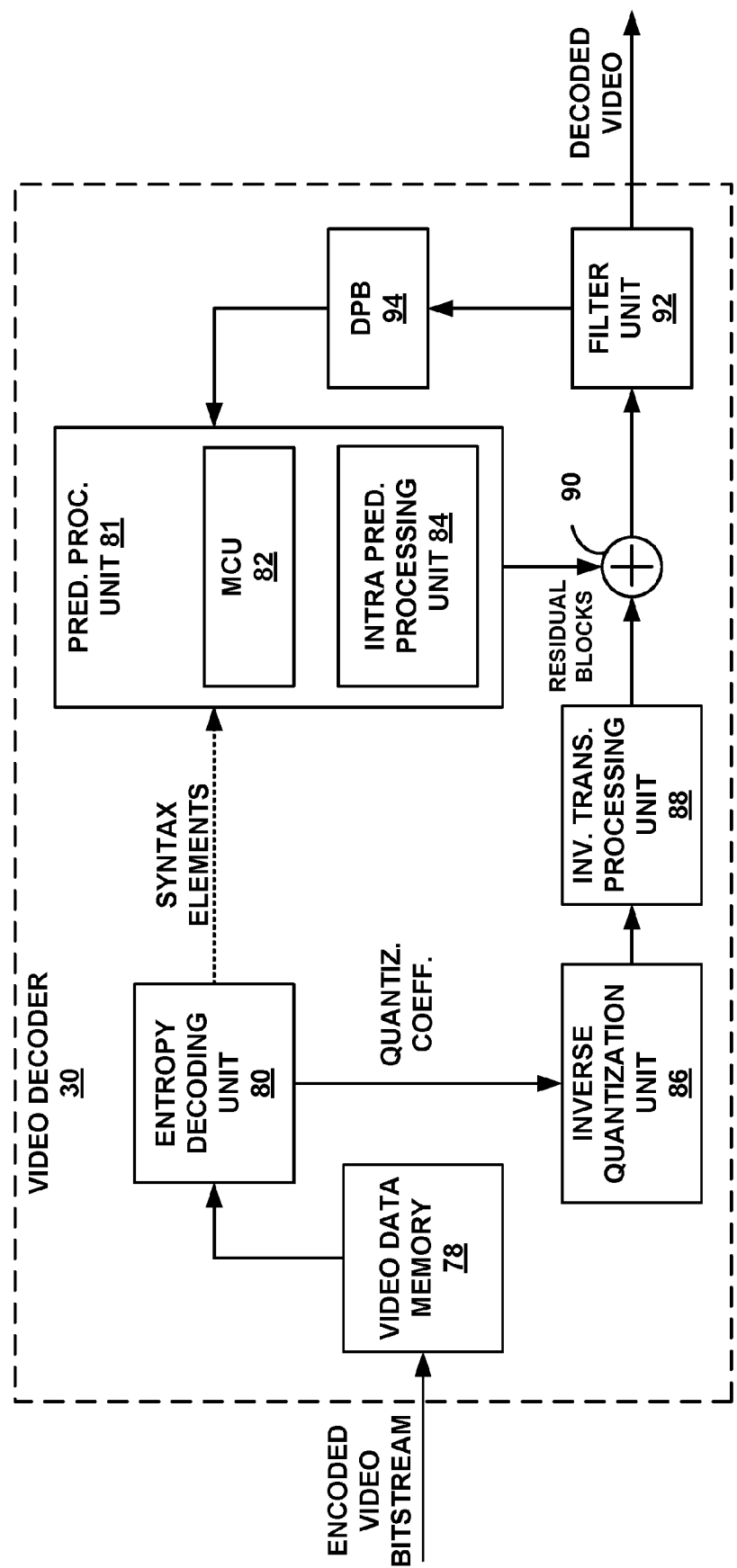
FIG. 10 is a block diagram illustrating an example video decoder that may implement OBMC techniques described in this disclosure.

FIG. 10 is a block diagram illustrating an example video decoder 30 that may implement the techniques described in this disclosure. In the example of FIG. 10, video decoder 30 includes video data memory 78, entropy decoding unit 80, prediction processing unit 81, inverse quantization unit 86, inverse transform processing unit 88, summer 90, and DPB 94. Prediction processing unit 81 includes motion compensation unit 82 and intra prediction unit 84. Video decoder 30 may, in some examples, perform a decoding pass generally reciprocal to the encoding pass described with respect to video encoder 20 from FIG. 9. One or more components of FIG. 10 may perform one or more techniques described in this disclosure.

During the decoding process, video decoder 30 receives an encoded video bitstream that represents video blocks of an encoded video slice and associated syntax elements from video encoder 20. Video decoder 30 stores the received encoded video bitstream in video data memory 78. Video data memory 78 may store video data, such as an encoded video bitstream, to be decoded by the components of video decoder 30. The video data stored in video data memory 78 may be obtained, for example, via link 16, from storage device 26, or from a local video source, such as a camera, or by accessing physical data storage media. Video data memory 78 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 78 and DPB 94 may be formed by any of a variety of memory devices, such as DRAM, SDRAM, MRAM, RRAM, or other types of memory devices. Video data memory 78 and DPB 94 may be provided by the same memory device or separate memory devices. In various examples, video data memory 78 may be on-chip with other components of video decoder 30, or off-chip relative to those components.

Entropy decoding unit 80 of video decoder 30 entropy decodes the video data stored in video data memory 78 to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction unit 84 of prediction processing unit 81 may generate prediction data for a video block of the current video slice based on a signaled intra prediction mode and data from previously decoded blocks of the current frame or picture. When the video frame is coded as an inter-coded (i.e., B or P) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 94.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After prediction processing unit generates the predictive block for the current video block using, for example, intra or inter prediction, video decoder 30 forms a reconstructed video block by summing the residual blocks from inverse transform processing unit 88 with the corresponding predictive blocks generated by motion compensation unit 82. Summer 90 represents the component or components that perform this summation operation. Filter unit 92 filters the reconstructed video block using, for example, one or more of deblocking filtering, SAO filtering, ALF filtering, or other types of filtering. Other loop filters (either in the coding loop or after the coding loop) may also be used to smooth pixel transitions or otherwise improve the video quality. The decoded video blocks in a given frame or picture are then stored in DPB 94, which stores reference pictures used for subsequent motion compensation. DPB 94 may be part of or separate from additional memory that stores decoded video for later presentation on a display device, such as display device 32 of FIG. 1.

Video decoder 30 represents an example of a video decoder configured to perform Sub-block based OBMC, Sub-PU based OBMC, CU-boundary based OBMC, or any combination thereof. For example, video decoder 30 may be configured to receiving a first block of video data that is, in this example, a sub-block of a prediction unit. Video decoder 30 may be configured to receive one or more blocks of video data that neighbor the first block of video data, determine at least one motion vector of at least one of the one or more blocks of video data that neighbor the first block of video data, and decode, using overlapped block motion compensation, the first block of video data based at least in part on the at least one motion vector of the at least one of the one or more blocks that neighbor the first block of video data.

Figure 11:
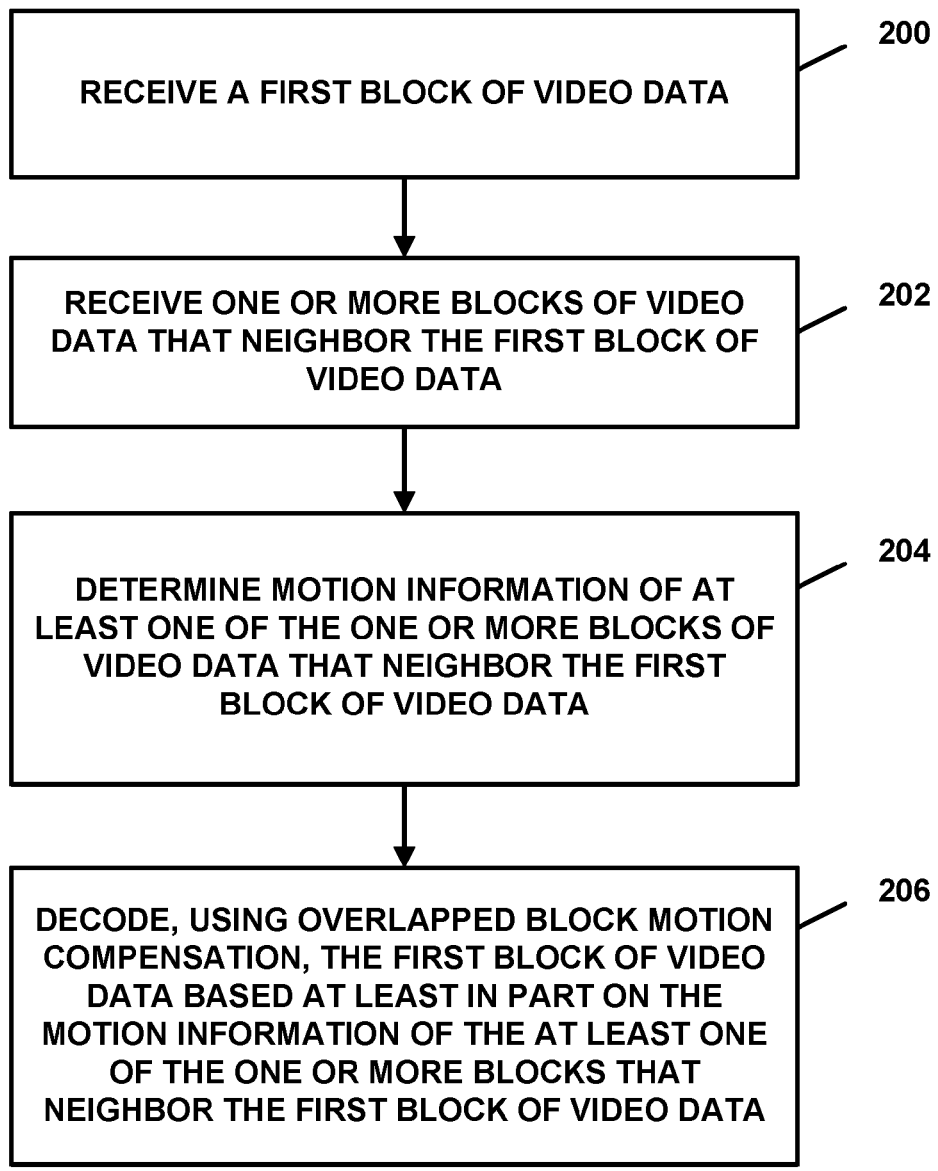
FIG. 11 is a flowchart illustrating an example process for decoding video data consistent with techniques for OMBC video coding of this disclosure.

FIG. 11 is a flowchart illustrating an example process for decoding video data consistent with techniques of this disclosure. The process of FIG. 11 is generally described as being performed by video decoder 30 for purposes of illustration, although a variety of other processors may also carry out the process shown in FIG. 11. In some examples, video data memory 78, entropy decoding unit 80, and/or prediction processing unit 81 may perform one or more processes shown in FIG. 11.

In the example of FIG. 11, video decoder 30 may be configured to receive a first block of video data (200). In some examples, the first block of video data is a sub-block of a prediction unit. In some examples, the first block of video data is a square sub-block or a non-square sub-block of a prediction unit.

Video decoder 30 may be configured to receive one or more blocks of video data that neighbor the first block of video data (202). In some examples, the one or more blocks of video data that neighbor the first block of video are square sub-blocks, non-square sub-blocks, or a combination of at least one square sub-block and at least one non-square sub-block.

Video decoder 30 may be configured to determine motion information of at least one of the one or more blocks of video data that neighbor the first block of video data (204). In some examples, video decoder 30 may be configured to determine the at least one motion vector of the at least one of the one or more blocks of video data that neighbor the first block of video data by decoding the at least one block of the one or more blocks of video data that neighbor the first block of video data. Video decoder 30 may be configured to decode, using overlapped block motion compensation, the first block of video data based at least in part on the motion information of the at least one of the one or more blocks that neighbor the first block of video data (206).

In some examples, video decoder 30 may be configured to determine whether at least one of the one or more blocks of video data that neighbor the first block of video data is not decoded. In such examples, video decoder 30 may be configured to decode the first block of video data without using motion information corresponding to the at least one block of the one or more blocks determined to be not decoded.

In some examples, video decoder 30 may be configured to generate a first prediction block for the first block of video data. The first prediction block may include a value for each pixel position for the first block of video data. Video decoder 30 may be configured to generate a neighbor prediction block for at least one of the one or more blocks of video data that neighbor the first block of video. The neighbor prediction block may include a value for each pixel position for the at least one of the one or more blocks of video data that neighbor the first block of video. Video decoder 30 may be configured to modify one or more values of the first prediction block based on one or more values of the neighbor prediction block to generate a modified first prediction block. Video decoder 30 may be configured to decode the first block of video data using the modified first prediction block.

In some examples, video decoder 30 may be configured to assign a first weighted value to one or more values of the first prediction block. Video decoder 30 may be configured to assign a second weighted value to one or more values of the neighbor prediction block. Video decoder 30 may be configured to modify the one or more values of the first prediction block based on the first weighted value and the second weighted value to generate the modified first prediction block.

In some examples, video decoder 30 may be configured to generate a first prediction block for the first block of video data. The first prediction block may include a value for each pixel position for the first block of video data. Video decoder 30 may be configured to assign, based on a size of the first block of video data, one or more weighted values to one or more values of the first prediction block. Video decoder 30 may be configured to decode the first block of video data using the one or more weighted values assigned to the one or more values of the first prediction block. In such examples, video decoder 30 may be configured to generate a first neighbor prediction block based on the motion information of at least one of the one or more blocks of video data that neighbor the first block of video data. Video decoder 30 may be configured to assign, based on a size of the first neighbor block, one or more weighted values to one or more values of the first neighbor prediction block. Video decoder 30 may be configured to decode the first block of video data using the one or more weighted values assigned to the one or more values of the first neighbor prediction block.

In some examples, video decoder 30 may be configured to modify one or more values of the first prediction block based on the one or more weighted values assigned to the one or more values of the first neighbor prediction block to generate a modified first prediction block, and decode the first block of video data using the modified first prediction block. In some examples, video decoder 30 may be configured to generate a second neighbor prediction block based on the motion information of at least one of the one or more blocks of video data that neighbor the first block of video data. In such examples, video decoder 30 may be configured to assign, based on a size of the second neighbor block, one or more weighted values to one or more values of the second neighbor prediction block. Video decoder 30 may be configured to modify one or more values of the first and prediction blocks based on the one or more weighted values assigned to the one or more values of the first and second neighbor prediction blocks to generate the modified first prediction block.

In some examples, video decoder 30 may be configured to receive a syntax element having a value representative of whether the first block of video data is encoded according to an overlapped block motion compensation mode. For example, the syntax element may be received in a bitstream generated by a video encoder (e.g., video encoder 20). Video decoder 30 may be configured to determine that the first block of video data is encoded according to the overlapped block motion compensation mode based on the value of the syntax element.

Figure 12:
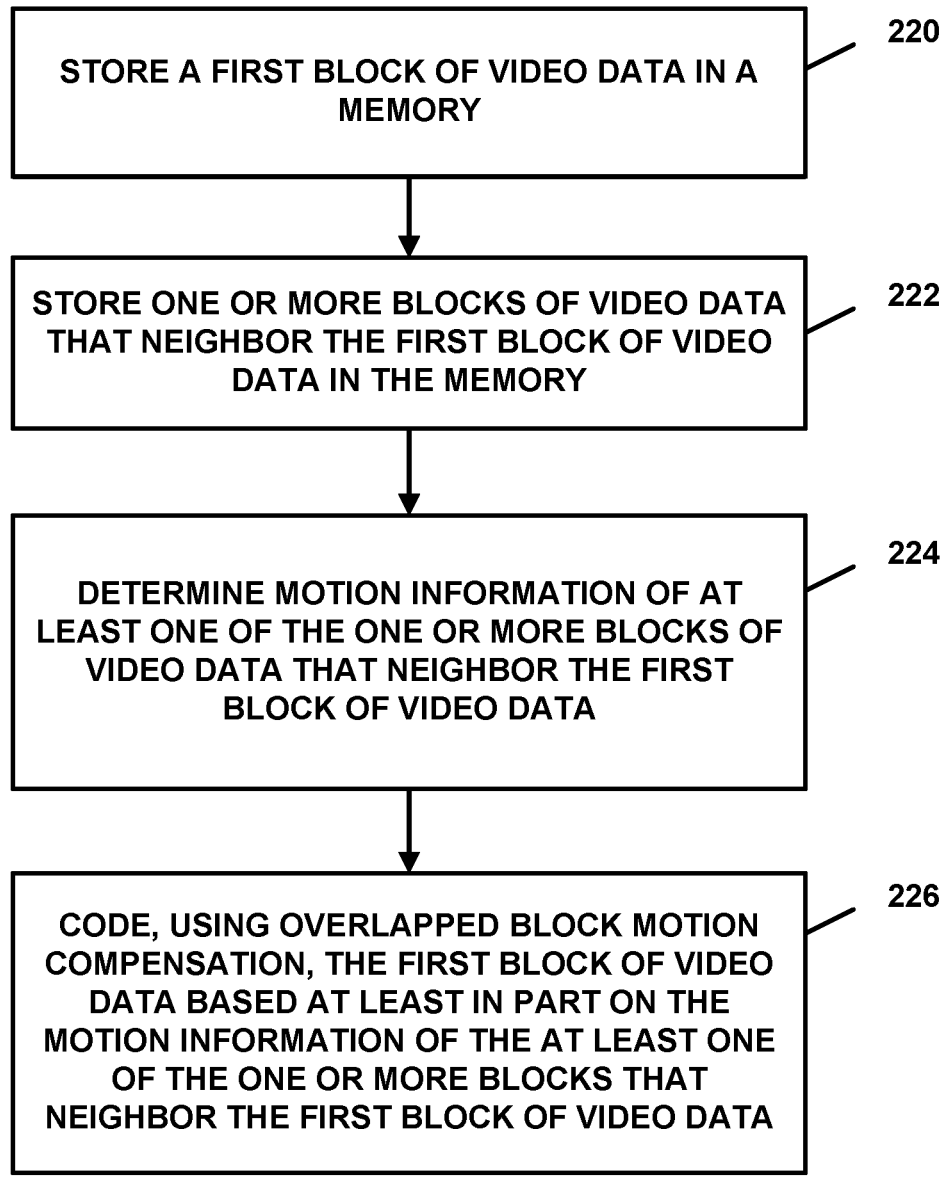
FIG. 12 is a flowchart illustrating an example process for encoding video data consistent with techniques for OMBC video coding of this disclosure.

FIG. 12 is a flowchart illustrating an example process for encoding video data consistent with techniques of this disclosure. The process of FIG. 12 is generally described as being performed by a video coder for purposes of illustration, although a variety of other processors may also carry out the process shown in FIG. 12. As used herein, a video coder may refer to a video encoder and/or a video decoder (e.g., video encoder 20 and/or a video decoder 30) In some examples, video data memory 33, partitioning unit 35, prediction processing unit 41, and/or entropy encoding unit 56 may perform one or more processes shown in FIG. 12. In some examples, video data memory 78, entropy decoding unit 80, and/or prediction processing unit 81 may perform one or more processes shown in FIG. 12.

In the example of FIG. 12, a video coder may be configured to store a first block of video data in a memory (220). In some examples, the one or more blocks of video data that neighbor the first block of video are square sub-blocks, non-square sub-blocks, or a combination of at least one square sub-block and at least one non-square sub-block.

The video coder may be configured to store one or more blocks of video data that neighbor the first block of video data in the memory (222). In some examples, the one or more blocks of video data that neighbor the first block of video are square sub-blocks, non-square sub-blocks, or a combination of at least one square sub-block and at least one non-square sub-block.

The video coder may be configured to determine motion information of at least one of the one or more blocks of video data that neighbor the first block of video data (224). In some examples, the video coder may be configured to determine the at least one motion vector of the at least one of the one or more blocks of video data that neighbor the first block of video data by coding the at least one block of the one or more blocks of video data that neighbor the first block of video data. In some examples, the video coder may be configured to code, using overlapped block motion compensation, the first block of video data based at least in part on the motion information of the at least one of the one or more blocks that neighbor the first block of video data (226).

In some examples, the video coder may be configured to determine whether at least one of the one or more blocks of video data that neighbor the first block of video data is not coded. In such examples, the video coder may be configured to code the first block of video data without using motion information corresponding to the at least one block of the one or more blocks determined to be not coded.

In some examples, the video coder may be configured to generate a first prediction block for the first block of video data. The first prediction block may include a value for each pixel position for the first block of video data. The video coder may be configured to generate a neighbor prediction block for at least one of the one or more blocks of video data that neighbor the first block of video. The neighbor prediction block may include a value for each pixel position for the at least one of the one or more blocks of video data that neighbor the first block of video. The video coder may be configured to modify one or more values of the first prediction block based on one or more values of the neighbor prediction block to generate a modified first prediction block. The video coder may be configured to code the first block of video data using the modified first prediction block.

In some examples, the video coder may be configured to assign a first weighted value to one or more values of the first prediction block. The video coder may be configured to assign a second weighted value to one or more values of the neighbor prediction block. The video coder may be configured to modify the one or more values of the first prediction block based on the first weighted value and the second weighted value to generate the modified first prediction block.

In some examples, the video coder may be configured to generate a first prediction block for the first block of video data. The first prediction block may include a value for each pixel position for the first block of video data. The video coder may be configured to assign, based on a size of the first block of video data, one or more weighted values to one or more values of the first prediction block. The video coder may be configured to code the first block of video data using the one or more weighted values assigned to the one or more values of the first prediction block. In such examples, the video coder may be configured to generate a first neighbor prediction block based on the motion information of at least one of the one or more blocks of video data that neighbor the first block of video data. The video coder may be configured to assign, based on a size of the first neighbor block, one or more weighted values to one or more values of the first neighbor prediction block. The video coder may be configured to code the first block of video data using the one or more weighted values assigned to the one or more values of the first neighbor prediction block.

In some examples, the video coder may be configured to modify one or more values of the first prediction block based on the one or more weighted values assigned to the one or more values of the first neighbor prediction block to generate a modified first prediction block, and code the first block of video data using the modified first prediction block. In some examples, the video coder may be configured to generate a second neighbor prediction block based on the motion information of at least one of the one or more blocks of video data that neighbor the first block of video data. In such examples, the video coder may be configured to assign, based on a size of the second neighbor block, one or more weighted values to one or more values of the second neighbor prediction block. The video coder may be configured to modify one or more values of the first and prediction blocks based on the one or more weighted values assigned to the one or more values of the first and second neighbor prediction blocks to generate the modified first prediction block.

In some examples, the video coder may be configured to receive a syntax element having a value representative of whether the first block of video data is encoded according to an overlapped block motion compensation mode. For example, the syntax element may be received in a bitstream generated by a video encoder (e.g., video encoder 20). The video coder may be configured to determine that the first block of video data is encoded according to the overlapped block motion compensation mode based on the value of the syntax element.

In some examples, the video coder may be configured to generate a syntax element having a value representative of whether the first block of video data is encoded according to an overlapped block motion compensation mode. In such examples, the video coder may be configured to transmit the syntax element in a bitstream, which may be received by a video decoder (e.g., video decoder 30).

It should be understood that all of the techniques described herein may be used individually or in combination. For example, video encoder 20 and/or one or more components thereof and video decoder 30 and/or one or more components thereof may perform the techniques described in this disclosure in any combination. As another example, the techniques described herein may be performed by video encoder 20 (FIGS. 1 and 9) and/or video decoder 30 (FIGS. 1 and 10), both of which may be generally referred to as a video coder. Likewise, video coding may refer to video encoding or video decoding, as applicable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

Certain aspects of this disclosure have been described with respect to one or more video coding standards—whether released, under development, or the like—for purposes of illustration. However, the techniques described in this disclosure may be useful for other video coding processes, including other standard or proprietary video coding processes not yet developed.

In accordance with this disclosure, the term "or" may be interrupted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described herein. Any combination of the described systems, operations, functions, or examples is contemplated. These and other examples are within the scope of the following claims.

What is claimed is:

1. A method of decoding encoded video data, the method comprising:
   receiving, in an encoded video bitstream, a first sub-block of a prediction unit of the encoded video data, the prediction unit being partitioned into a plurality of sub-blocks including the first sub-block and one or more neighboring sub-blocks;
   receiving, in the encoded video bitstream, the one or more neighboring sub-blocks of the prediction unit, each of the one or more neighboring sub-blocks neighboring the first sub-block of the plurality of sub-blocks of the prediction unit;
   parsing, from the encoded video bitstream, a syntax element;
   determining that the syntax element is set to a value indicating that the first sub-block of the plurality of sub-blocks of the prediction unit is encoded according to an overlapped block motion compensation mode;
   based on the value of the parsed syntax element, determining that the first sub-block of the plurality of sub-blocks of the prediction unit is encoded according to the overlapped block motion compensation mode;
   determining motion information of at least one of the one or more neighboring sub-blocks; and
   based on the first sub-block being encoded according to the overlapped block motion compensation mode, decoding, using the overlapped block motion compensation mode, the first sub-block of the prediction unit using the determined motion information of the at least one of the one or more neighboring sub-blocks.

2. The method of claim 1, further comprising:
   determining that a first neighboring sub-block of the one or more neighboring sub-blocks is not decoded; and
   decoding the first sub-block of the prediction unit without using any motion information associated with the first neighboring sub-block that is determined to not be decoded.

3. The method of claim 1, wherein determining the motion information of the at least one of the one or more neighboring sub-blocks comprises decoding the at least one neighboring sub-block.

4. The method of claim 1, further comprising:
   generating a first prediction block for the first sub-block of the prediction unit, wherein the first prediction block includes a respective value for each respective pixel position of a plurality of pixel positions for the first sub-block of the prediction unit;
   assigning, based on a size of the first sub-block of the prediction unit, one or more weighted values to one or more values of the first prediction block; and
   decoding the first sub-block of the prediction unit using the one or more weighted values assigned to the one or more values of the first prediction block generated for the first sub-block of the prediction unit.

5. The method of claim 4, further comprising:
   generating a first neighbor prediction block based on the motion information of at least a first neighboring sub-block of the one or more neighboring sub-blocks;
   assigning, based on a size of the first neighboring sub-block, one or more weighted values to one or more values of the first neighbor prediction block; and
   decoding the first sub-block of the prediction unit using the one or more weighted values assigned to the one or more values of the first neighbor prediction block.

6. The method of claim 5, further comprising:
   modifying one or more values of the first prediction block based on the one or more weighted values assigned to the one or more values of the first neighbor prediction block to form a first modified prediction block; and
   decoding the first sub-block of the prediction unit using the first modified prediction block.

7. The method of claim 6, further comprising:
   generating a second neighbor prediction block based on motion information of a second neighboring sub-block of the one or more neighboring sub-blocks;

assigning, based on a size of the second neighboring sub-block, one or more weighted values to one or more values of the second neighbor prediction block; and modifying one or more values of the first and second neighbor prediction blocks based on the one or more weighted values assigned to the one or more values of the first and second prediction blocks to generate the first modified prediction block.

8. The method of claim 1, wherein the value of the syntax element is a true value, wherein the true value indicates that the first sub-block of the prediction unit is encoded according to the overlapped block motion compensation mode, and wherein determining that the first sub-block of the prediction unit is encoded according to the overlapped block motion compensation mode based on the value of the syntax element comprises determining that the first sub-block of the prediction unit is encoded according to the overlapped block motion compensation mode based on the value of the syntax element being equal to the true value.

9. A device for decoding video data, the device comprising:

a communications interface configured to receive an encoded video bitstream;

a memory coupled to the communications interface and configured to store encoded video data of the encoded video bitstream received by the communications interface; and processing circuitry in communication with the memory, wherein the processing circuitry is configured to:

retrieve, from the memory, a first sub-block of a prediction unit of the encoded video data stored to the memory, the prediction unit being partitioned into a plurality of sub-blocks including the first sub-block and one or more neighboring sub-blocks;

retrieve, from the memory, one or more neighboring sub-blocks of the prediction unit of the encoded video data stored to the memory, each of the one or more neighboring sub-blocks neighboring the first sub-block of the plurality of sub-blocks of the prediction unit of the encoded video data stored to the memory;

parse, from the memory, a syntax element;

determine that the syntax element is set to a value indicating that the first sub-block of the plurality of sub-blocks of the prediction unit is encoded according to an overlapped block motion compensation mode;

based on the value of the parsed syntax element, determine that the first sub-block of the prediction unit is encoded according to the overlapped block motion compensation mode;

determine motion information of at least one of the one or more neighboring sub-blocks; and based on the first sub-block being encoded according to the overlapped block motion compensation mode, decode, using the overlapped block motion compensation mode, the first sub-block of the prediction unit using the determined motion information of the at least one of the one or more neighboring sub-blocks.

10. The device of claim 9, wherein the processing circuitry is further configured to:

determine that a first neighboring sub-block of the one or more neighboring sub-blocks is not decoded; and decode the first sub-block of the prediction unit without using any motion information associated with the first neighboring sub-block that is determined to not be decoded.

11. The device of claim 9, wherein to determine the motion information of the at least one of the one or more neighboring sub-blocks, the processing circuitry is configured to decode the at least one neighboring sub-block.

12. The device of claim 9, wherein the processing circuitry is further configured to:

generate a first prediction block for the first sub-block of the prediction unit, wherein the first prediction block includes a respective value for each respective pixel position of a plurality of pixel positions for the first sub-block of the prediction unit;

assign, based on a size of the first sub-block of the prediction unit, one or more weighted values to one or more values of the first prediction block; and code the first sub-block of the prediction unit using the one or more weighted values assigned to the one or more values of the first prediction block generated for the first sub-block of the prediction unit.

13. The device of claim 12, wherein the processing circuitry is further configured to:

generate a first neighbor prediction block based on the motion information of at least a first neighboring sub-block of the one or more neighboring sub-blocks;

assign, based on a size of the first neighboring sub-block, one or more weighted values to one or more values of the first neighbor prediction block; and decode the first sub-block of the prediction unit using the one or more weighted values assigned to the one or more values of the first neighbor prediction block.

14. The device of claim 13, wherein the video coder is further configured to:

modify one or more values of the first prediction block based on the one or more weighted values assigned to the one or more values of the first neighbor prediction block to form a first modified prediction block; and decode the first sub-block of the prediction unit using the first modified prediction block.

15. The device of claim 14, wherein the processing circuitry is further configured to:

generate a second neighbor prediction block based on motion information of at least a second neighboring sub-block of the one or more neighboring sub-blocks;

assign, based on a size of the second neighboring sub-block, one or more weighted values to one or more values of the second neighbor prediction block; and modify one or more values of the first and second neighbor prediction blocks based on the one or more weighted values assigned to the one or more values of the first and second neighbor prediction blocks to generate the first modified prediction block.

16. The device of claim 9, wherein the value of the syntax element is a true value, wherein the true value indicates that the first sub-block of the prediction unit is encoded according to the overlapped block motion compensation mode, and wherein to determine that the first sub-block of the prediction unit is encoded according to the overlapped block motion compensation mode based on the value of the syntax element, the processing circuitry is configured to determine that the first sub-block of the prediction unit is encoded according to the overlapped block motion compensation mode based on the value of the syntax element being equal to the true value.

17. An apparatus for decoding encoded video data, the apparatus comprising:
- means for receiving, in an encoded video bitstream, a first sub-block of a prediction unit of the encoded video data, the prediction unit being partitioned into a plurality of sub-blocks including the first sub-block and one or more neighboring sub-blocks;
- means for receiving, in the encoded video bitstream, the one or more neighboring sub-blocks of the prediction unit, each of the one or more neighboring sub-blocks neighboring the first sub-block of the plurality of sub-blocks of the prediction unit;
- means for parsing, from the encoded video bitstream, a syntax element;
- means for determining that the syntax element is set to a value indicating that the first sub-block of the plurality of sub-blocks of the prediction unit is encoded according to an overlapped block motion compensation mode;
- means for determining, based on the value of the parsed syntax element, that the first sub-block of the plurality of sub-blocks of the prediction unit is encoded according to the overlapped block motion compensation mode;
- means for determining motion information of at least one of the one or more neighboring sub-blocks; and
- means for decoding, based on the first sub-block being encoded according to the overlapped block motion compensation mode, using the overlapped block motion compensation mode, the first sub-block of the prediction unit using the determined motion information of the at least one of the one or more neighboring sub-blocks.

18. The apparatus of claim 17, further comprising:
- means for determining that a first neighboring sub-block of the one or more neighboring sub-blocks is not decoded; and
- means for coding the first sub-block of the prediction unit without using any motion information associated with the first neighboring sub-block that is determined to not be decoded.

19. The apparatus of claim 17, wherein the
- means for determining the motion information of the at least one of the one or more neighboring sub-blocks comprises means for decoding the at least one neighboring sub-block.

20. The apparatus of claim 17, further comprising:
- means for generating a first prediction block for the first sub-block of the prediction unit, wherein the first prediction block includes a respective value for each respective pixel position of a plurality of pixel positions for the first sub-block of the prediction unit;
- means for assigning, based on a size of the first sub-block of the prediction unit, one or more weighted values to one or more values of the first prediction block; and
- means for decoding the first sub-block of the prediction unit using the one or more weighted values assigned to the one or more values of the first prediction block generated for the first sub-block of the prediction unit.

21. The apparatus of claim 20, further comprising:
- means for generating a first neighbor prediction block based on the motion information of a first neighboring sub-block of the one of the one or more neighboring sub-blocks;
- means for assigning, based on a size of the first neighboring sub-block, one or more weighted values to one or more values of the first neighbor prediction block; and
- means for decoding the first sub-block of the prediction unit using the one or more weighted values assigned to the one or more values of the first neighbor prediction block.

22. The apparatus of claim 21, further comprising:
- means for modifying one or more values of the first prediction block based on the one or more weighted values assigned to the one or more values of the first neighbor prediction block to form a first modified neighbor prediction block; and
- means for decoding the first sub-block of the prediction unit using the first modified prediction block.

23. The apparatus of claim 17, wherein the value of the syntax element is a true value, wherein the true value indicates that the first sub-block of the prediction unit is encoded according to the overlapped block motion compensation mode, and
- wherein the means for determining that the first sub-block of the prediction unit is encoded according to the overlapped block motion compensation mode based on the value of the syntax element comprise means for determining that the first sub-block of the prediction unit is encoded according to the overlapped block motion compensation mode based on the value of the syntax element being equal to the true value.

24. A non-transitory computer-readable storage medium having instructions stored that, when executed, cause one or more processors of a video decoding device to:
- store, to the non-transitory computer-readable storage medium, a first sub-block of a prediction unit of encoded video data, the prediction unit being partitioned into a plurality of sub-blocks including the first sub-block and one or more neighboring sub-blocks;
- store, to the non-transitory computer-readable storage medium, one or more neighboring sub-blocks of the prediction unit, each of the one or more neighboring sub-blocks neighboring the first sub-block of the plurality of sub-blocks of the prediction unit;
- parse a syntax element;
- determine that the parsed syntax element is set to a value indicating that the first sub-block of the plurality of sub-blocks of the prediction unit is encoded according to an overlapped block motion compensation mode;
- based on the value of the parsed syntax element, determine that the first sub-block of the plurality of sub-blocks of the prediction unit is encoded according to the overlapped block motion compensation mode;
- determine motion information of at least one of the one or more neighboring sub-blocks; and
- based on the first sub-block being encoded according to the overlapped block motion compensation mode, decode, using the overlapped block motion compensation mode, the first sub-block of the prediction unit using the determined motion information of the at least one of the one or more neighboring sub-blocks.

25. The non-transitory computer-readable storage medium of claim 24, having further instructions stored thereon that, when executed, cause the one or more processors to:
- determine that a first neighboring sub-block of the one or more neighboring sub-blocks is not decoded; and
- decode the first sub-block of the prediction unit without using any motion information associated with the first neighboring sub-block that is determined to not be decoded.

26. The non-transitory computer-readable storage medium of claim 24, wherein the instructions that, when executed, cause the one or more processors to determine the motion information of the at least one of the one or more neighboring sub-blocks comprise instruction that, when executed, cause the one or more processors to decode the at least one neighboring sub-block.

27. The non-transitory computer-readable storage medium of claim 24, having further instructions stored thereon that, when executed, cause the one or more processors to:
generate a first prediction block for the first sub-block of the prediction unit, wherein the first prediction block includes a respective value for each respective pixel position of a plurality of pixel positions for the first sub-block of the prediction unit;
assign, based on a size of the first sub-block of the prediction unit, one or more weighted values to one or more values of the first prediction block; and
decode the first sub-block of the prediction unit using the one or more weighted values assigned to the one or more values of the first prediction block generated for the first sub-block of the prediction unit.

28. The non-transitory computer-readable storage medium of claim 27, having further instructions stored thereon that, when executed, cause the one or more processors to:
generate a first neighbor prediction block based on the motion information of a first neighboring sub-block of the one of the one or more neighboring sub-blocks;
assign, based on a size of the first neighboring sub-block, one or more weighted values to one or more values of the first neighbor prediction block; and
decode the first sub-block of the prediction unit using the one or more weighted values assigned to the one or more values of the first neighbor prediction block.

29. The non-transitory computer-readable storage medium of claim 28, having further instructions stored thereon that, when executed, cause the one or more processors to:
modify one or more values of the first prediction block based on the one or more weighted values assigned to the one or more values of the first neighbor prediction block to form a first modified prediction block; and
decode the first sub-block of the prediction unit using the first modified prediction block.

30. The non-transitory computer-readable storage medium of claim 24, wherein the value of the syntax element is a true value, wherein the true value indicates that the first sub-block of the prediction unit is encoded according to the overlapped block motion compensation mode, and wherein the instructions that, when executed, cause the one or more processors to determine that the first sub-block of the prediction unit is encoded according to the overlapped block motion compensation mode based on the value of the syntax element comprise instructions that, when executed, cause the one or more processors to determine that the first sub-block of the prediction unit is encoded according to the overlapped block motion compensation mode based on the value of the syntax element being equal to the true value.

31. The method of claim 1, the method being executable on a wireless communication device, wherein the wireless communication device comprises:
a receiver configured to receive the first sub-block of video data and the syntax element;
a memory configured to store the first sub-block of video data; and
a processor configured to execute instructions to process the first sub-block of video data stored in the memory.

32. The method of claim 31, wherein the wireless communication device is a telephone, and the first sub-block of video data and the syntax element are received by the receiver and demodulated according to a communication standard.

33. The device of claim 9, wherein the device is a wireless communication device, further comprising:
a receiver configured to receive the first sub-block of video data and the syntax element.

34. The device of claim 33, wherein the wireless communication device is a telephone, and the first sub-block of video data and the syntax element are received by the receiver and demodulated according to a communication standard.

\* \* \* \* \*